US008272530B2

(12) United States Patent
Rebernik

(10) Patent No.: US 8,272,530 B2
(45) Date of Patent: Sep. 25, 2012

(54) CONTAINER FOR RECEIVING MEDIA AND/OR DEVICES TO BE STORED AT LOW TEMPERATURES

(76) Inventor: Matthias Rebernik, Graz (AT)

( * ) Notice: Subject to any disclaimer, the term of this patent is extended or adjusted under 35 U.S.C. 154(b) by 514 days.

(21) Appl. No.: 12/443,275

(22) PCT Filed: Sep. 25, 2007

(86) PCT No.: PCT/AT2007/000451
§ 371 (c)(1),
(2), (4) Date: Jun. 23, 2009

(87) PCT Pub. No.: WO2008/036991
PCT Pub. Date: Apr. 3, 2008

(65) Prior Publication Data
US 2010/0011782 A1    Jan. 21, 2010

(30) Foreign Application Priority Data

Sep. 27, 2006  (AT) ................................ A 1611/2006
Aug. 28, 2007  (AT) ................................ A 1348/2007

(51) Int. Cl.
*F17C 1/12*    (2006.01)
*F17C 1/02*    (2006.01)

(52) U.S. Cl. .................................. 220/560.05; 220/586

(58) Field of Classification Search ............. 220/592.26, 220/668, 647, 646, 4.12, FOR. 132, FOR. 181, 220/FOR. 127, 592.2, 592.01, 4.25, 4.24, 220/4.21; 206/0.6; F17C 3/08, 1/02, 13/08, F17C 1/12; A47J 41/00; B65D 81/38
See application file for complete search history.

(56) References Cited

U.S. PATENT DOCUMENTS

| | | | | | |
|---|---|---|---|---|---|
| 2,858,136 | A | * | 10/1958 | Rind | 280/832 |
| 2,962,182 | A | * | 11/1960 | Rossheim | 220/581 |
| 3,021,027 | A | | 2/1962 | Claxton | |
| 3,069,042 | A | * | 12/1962 | Johnston | 220/592.09 |
| 3,093,260 | A | * | 6/1963 | Macormack et al. | 220/560.05 |
| 3,341,052 | A | * | 9/1967 | Barthel | 220/560.1 |
| 3,347,402 | A | * | 10/1967 | Forman et al. | 220/560.1 |
| 3,414,155 | A | * | 12/1968 | Corvino | 220/4.12 |
| 3,487,971 | A | * | 1/1970 | Lewis et al. | 220/560.1 |
| 3,540,615 | A | * | 11/1970 | Burkley et al. | 220/560.13 |

(Continued)

FOREIGN PATENT DOCUMENTS

EP    0 014 250 A1    8/1980

(Continued)

*Primary Examiner* — Jacob K Ackun
*Assistant Examiner* — Robert J Hicks
(74) *Attorney, Agent, or Firm* — Birch, Stewart, Kolasch & Birch, LLP

(57) ABSTRACT

A container for receiving cryogenic media and/or units which are to be stored at low temperatures, having an outer shell (1) and an insulating shell (10) which is connected directly or indirectly to said outer shell (1) in a positionally stable manner and is optionally surrounded by one or more further insulating shells (10), wherein an inner shell (2) for storing cryogenic media is connected to the outer shell (1) via fastening elements (3) in a positionally stable manner. Each insulating shell (10) is of at least two-part configuration and is fastened to the outer shell (1) and/or to the inner shell (2) by positioning elements (11, 26, 27) which are independent of the fastening elements (3), wherein the insulating shell (10) is spaced apart without contact from the outer or inner shell (1,2) or from a further insulating shell (10) with the formation of a gap (15).

43 Claims, 29 Drawing Sheets

U.S. PATENT DOCUMENTS

Figure 1:
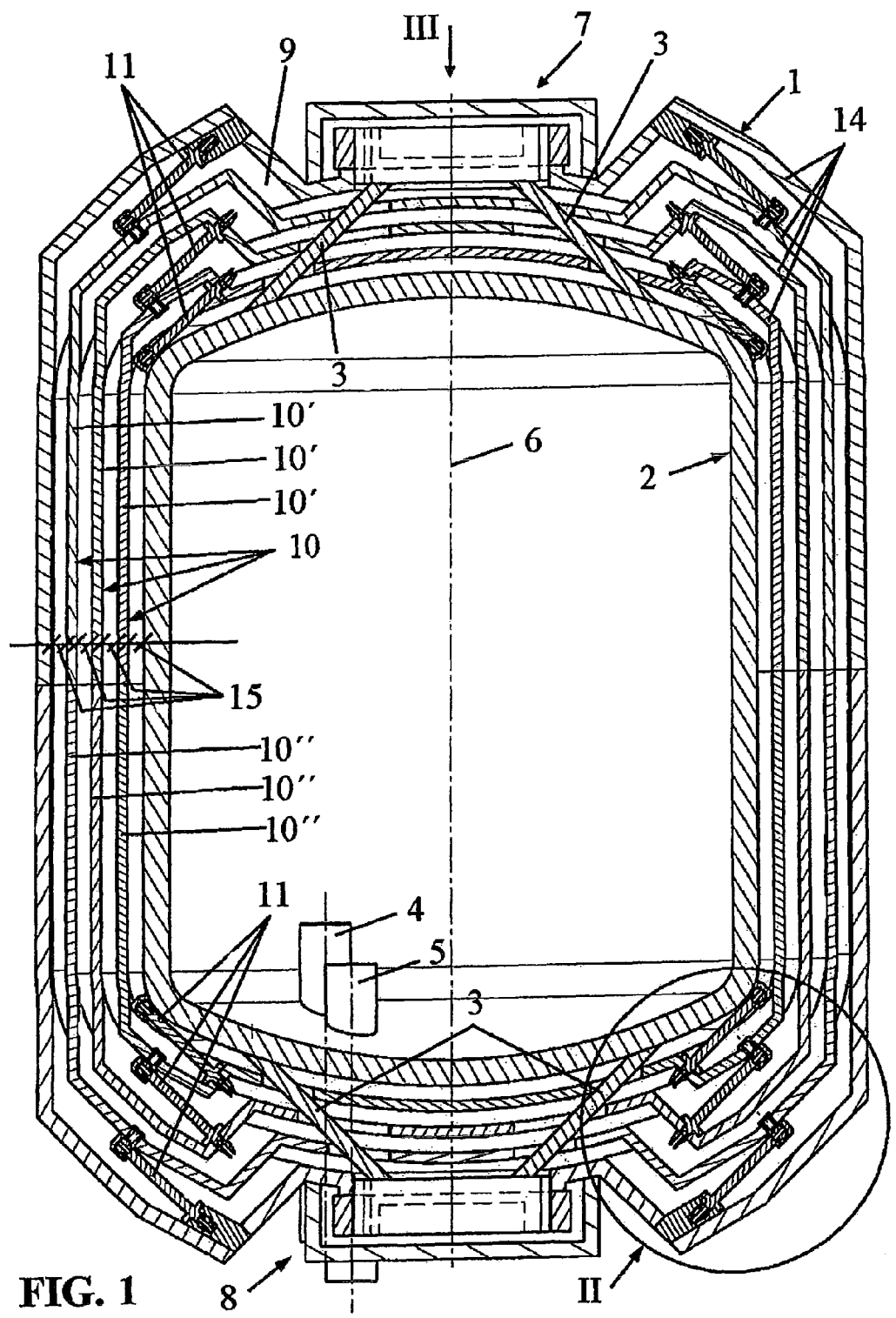

| | | | |
|---|---|---|---|
| 3,545,226 A * | 12/1970 | Caren et al. | 62/384 |
| 3,827,136 A * | 8/1974 | Yamamoto | 29/455.1 |
| 4,300,354 A | 11/1981 | Buchs et al. | |
| 4,304,038 A * | 12/1981 | Yabu et al. | 29/458 |
| 4,989,750 A * | 2/1991 | McGarvey | 220/560.01 |
| 5,012,948 A * | 5/1991 | Van Den Bergh | 220/560.05 |
| 5,140,823 A | 8/1992 | Mraz | |
| 2004/0195246 A1 * | 10/2004 | Immel et al. | 220/560.12 |

FOREIGN PATENT DOCUMENTS

| | | |
|---|---|---|
| EP | 0 397 168 A2 | 11/1990 |
| FR | 2 410 211 A1 | 6/1979 |
| JP | 61017798 A * | 1/1986 |
| JP | 02218184 A * | 8/1990 |
| JP | 5-126297 A | 5/1993 |

* cited by examiner

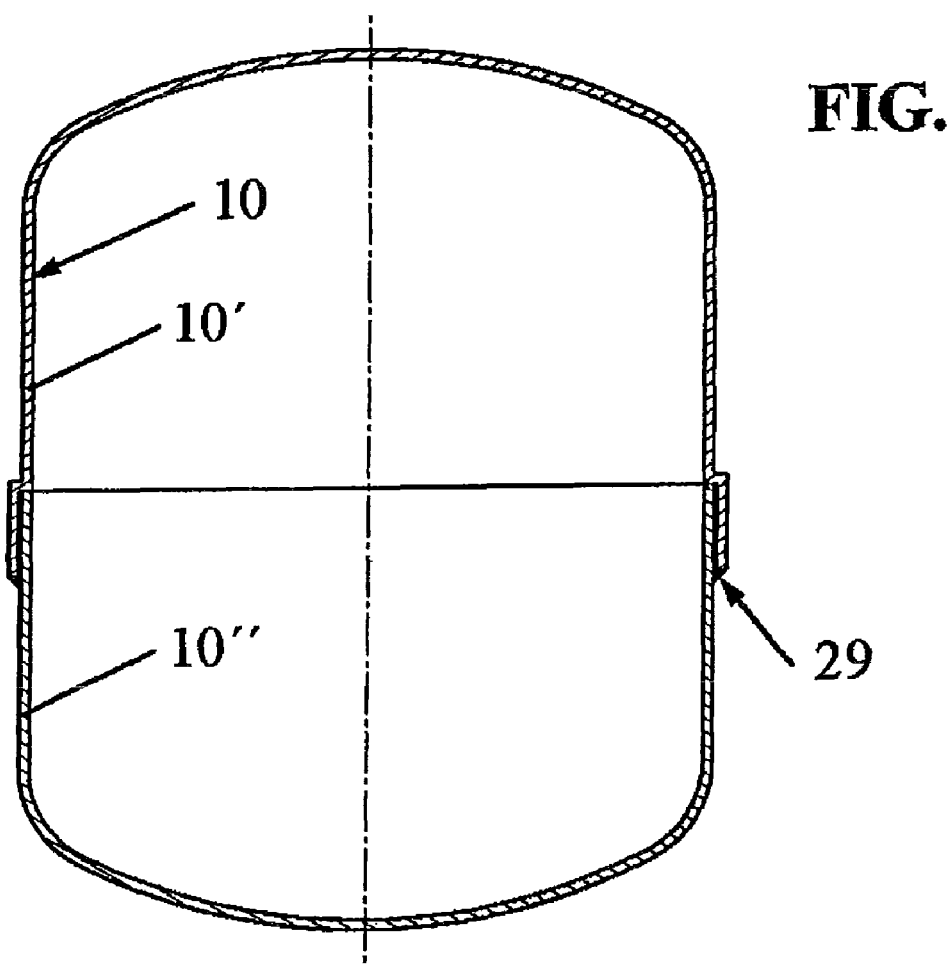
FIG. 11
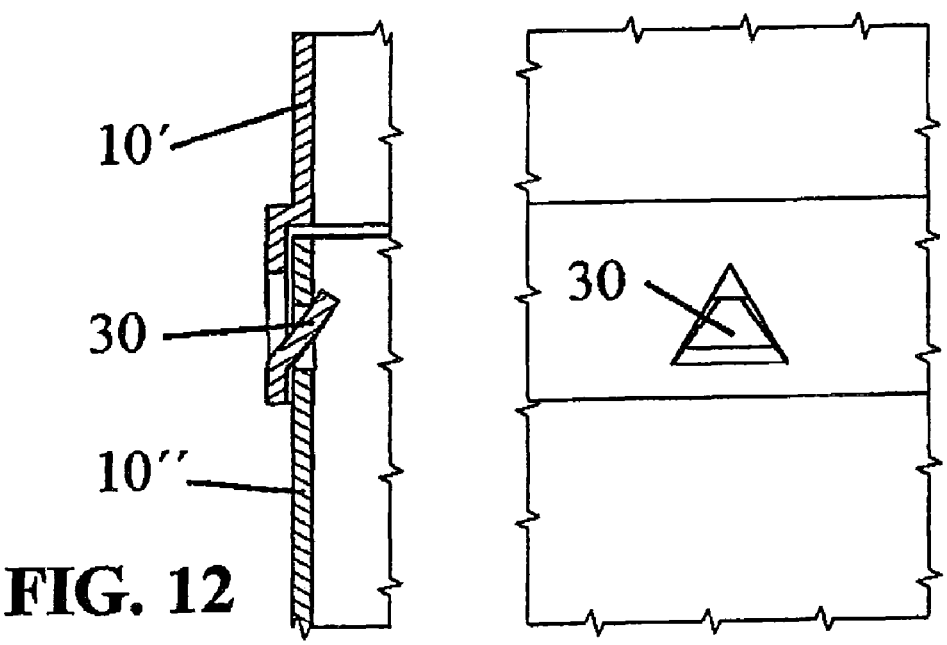
FIG. 13
FIG. 12

FIG. 17

FIG. 16

CONTAINER FOR RECEIVING MEDIA AND/OR DEVICES TO BE STORED AT LOW TEMPERATURES

The invention relates to a container for receiving cryogenic media and/or devices to be stored at low temperatures, preferably of below 150° Kelvin, comprising an outer shell and an insulating shell which in a positionally stable manner via positioning elements is directly or indirectly connected therewith or, respectively, is directly or indirectly supported thereon, and which, optionally, is surrounded by one or several further insulating shells, wherein either the device or an inner shell for storing cryogenic media is connected to the outer shell in a positionally stable manner via fastening elements.

Cryogenic media are understood to be liquefied gases, for example, helium, nitrogen, oxygen, natural gas or hydrogen. In the liquid state, the temperature of those gases usually amounts to less than 150° Kelvin. For storing those media, an inner shell incorporated in an outer shell is provided.

For the temperature insulation of a container for cryogenic media, in the following referred to as a cryotank, it is suitable to insulate the inner shell as strongly and as completely as possible in order to avoid heat losses as much as possible. The clearance between the inner shell and the outer shell is evacuated in most cases. However, the inner shell must be secured in the outer shell. Suitably, this occurs in such a way that as few thermal bridges as possible are formed between the two shells. Since, however, some kind of structural elements must necessarily be formed between the inner shell and the outer shell for mounting purposes, heat losses will inevitably occur via those mounting elements.

In U.S. Pat. No. 2,926,810, for example, a tank made of an outer shell and an inner shell is illustrated, with the inner shell being connected to the outer shell via cross-struts. The cross-struts made of a material of low thermal conductivity have diameters which are as small as possible in order to keep the thermal bridges as minor as possible.

Furthermore, to provide the inner shell with an additional insulation, insulating layers and/or radiation shields can be introduced into the clearance between the outer shell and the inner shell. For example, from DE 195 46 619, a cryocontainer is known in which the inner shell is surrounded by numerous insulating mats.

Furthermore, from U.S. Pat. No. 4,988,014, a cryocontainer is known in which a heat shield made of aluminium or copper is provided between the outer shell and the inner shell. Said heat shield is suspended, just like the inner shell, from two suspension brackets in opposite end regions of the cryocontainer.

From FR 2711640, a cryocontainer comprising an inner shell and an outer shell is known, wherein pads or pillows, respectively, made of an alternately conductive material and an insulating material are arranged in the clearance.

From WO 2006/034521 A1, it is known to hold the inner shell in suspense in a contactless manner relative to an outer shell of a cryotank using permanent magnets. No further insulating layers are provided between the inner shell and the outer shell.

Magnetic insulating layers for a cryotank between an outer shell and an inner shell can be learnt from US 2006/0196876 A1, whereby insulating spaces are likewise formed between the layers or, respectively, between the layers and the outer shell and the inner shell.

From AT 502 191 B1, a cryotank is known according to which an inner shell is supported on an outer shell via a supporting structure, wherein radiation barriers exhibiting high reflectivity are provided which produce numerous thermal bridges, since the radiation barriers themselves contact the inner shell directly and are also supported directly on one another.

A cryotank of the initially described kind is known, for example, from EP 0 014 250 B1, wherein an inner shell is supported on the outer shell via holding straps composed of single elements. Several insulating shells attached to the holding straps are arranged between the inner shell and the outer shell. Said insulating shells are provided at a distance from each other and at a distance from the inner shell and the outer shell. The construction of a cryocontainer of such a type is complex and its assembly is difficult. In addition, the insulating shells put strain on the fastening elements by means of which the inner shell is attached to the outer shell.

The invention aims to avoid said disadvantages and difficulties and its object is to provide a container of the initially described kind wherein the inner shell is not only securely suspended within the outer shell and properly secured against any mechanical and thermal stress that is occuring, but which also allows easy assembly in addition to minor heat losses so that the manufacturing expenditure is low even if a plurality of insulating shells are present. A further object is to securely fix the insulating shell in the clearance between the inner shell and the outer shell while keeping a distance as constant as possible both from the inner shell and from the outer shell as well as from optionally provided further insulating shells.

According to the invention, said object is achieved in that each insulating shell has at least a two-piece design and is attached to the outer shell and/or to the device and/or to the inner shell via positioning elements which are independent of the fastening elements, with the insulating shell being spaced apart in a contactless manner from the outer shell or the inner shell or the device or a further insulating shell, respectively, whereby a gap is formed.

A substantial advantage of the invention is the fact that the cryocontainer according to the invention can exist entirely without superinsulating layers or without MLI (multi layer insulation), respectively, which involves advantages in terms of price as well as with regard to the manufacturing process.

In order to achieve an effective insulation as radiation shields, it is advantageous if the insulating shells are spaced apart from each other, whereby the insulating effect can be increased further for by an intermediary vacuum. For lack of space, in particular for the application in motor vehicles, it is advantageous if distances as small as possible are formed between the insulating shells.

According to the invention, it is easily possible to avoid direct wall contact between the inner and outer shells and the insulating shell and the device in the state of rest.

Positioning elements are preferably formed from bolts.

According to another advantageous embodiment, positioning elements are designed as spring elements, in particular as helical spring elements.

Suitably, positioning elements clamp an insulating shell against the inner shell or against the outer shell and, accordingly, are supported or anchored, respectively, on the one hand, on the insulating shell and, on the other hand, on the inner shell or outer shell, respectively.

If two or more insulating shells are present, positioning elements are supported or anchored, respectively, on the one hand, on a first insulating shell and, on the other hand, on a further insulating shell adjacent to the first insulating shell.

At the locations where positioning elements are provided, the insulating shells or the outer shell, respectively, preferably have/has bulges extending alongside the positioning elements for locally receiving a positioning element, with the positioning elements being supported or anchored, respectively, in the end regions of the bulges. Thereby, it is possible to arrange the positioning elements such that they have lengths as large as possible so that heat transmissions through the positioning elements can be minimized.

According to a preferred embodiment, bolts are supported or anchored, respectively, on the device or on the inner shell or outer shell or on the insulating shell, respectively, on the one hand, by a collar provided on one of the ends thereof and, on the other hand, by a self-locking sealing ring slid onto the other end of a bolt.

A further preferred embodiment is characterized in that bolts are equipped with snap-in lugs provided at their ends which serve for being inserted into openings and for anchoring the bolts in said openings, with the openings being provided on the device or on the inner shell or outer shell or on an insulating shell, respectively.

For adjusting pretensions and/or for compensating thermal expansions, bolts are advantageously anchored with one end on the device or on the inner shell or outer shell, respectively, or on an insulating shell by means of a screw connection.

The longitudinal axis of the positioning elements is advantageously inclined toward the surface of the insulating shell or of the device or of the inner shell or outer shell, respectively, in the area of the attachment of the positioning elements.

It is also possible to form the positioning elements from magnets.

A suitable embodiment is characterized in that the positioning elements are arranged with regard to a longitudinal axis of the cryotank so as to be evenly distributed around said longitudinal axis, wherein suitably three positioning elements are arranged and distributed around the longitudinal axis.

Preferably, the insulating shell(s) is/are formed from two half shells each, which half shells are connectable to each other by a plug connection to form an insulating shell, wherein suitably each of the half shells is directly or indirectly attached to the outer shell and/or inner shell or to a further insulating shell, respectively, via positioning elements.

A further embodiment is characterized in that the insulating shell(s) is/are attached to the outer shell and/or inner shell via positioning elements, with forces securing the parts of the insulating shell relative to each other which are preferably produced by springs.

It is also possible that the parts of an insulating shell are positionally secured directly relative to each other, such as, for example, by hooks, an adhesive joint or a weld seam.

A further preferred embodiment is characterized in that positioning elements are designed as helical springs, with the helical springs being arranged in alignment with each other for supporting adjacent insulating shells and the insulating shells exhibiting access openings to the helical springs.

Preferably, a magnetizing coil is connected to the outer shell in a positionally stable manner via fastening elements.

An advantageous variant of the invention is characterized in that the insulating shells are connected both to each other and to the insulating shell designed as an inner tank and/or to the outer shell designed as an outer container via suspension belts or bands, respectively, which in particular are flexible and/or pliable, respectively.

In order to keep heat losses small, it is furthermore advantageous to design the suspension belts as long as possible.

Furthermore, it is advantageous to place the suspension belts such that the stability of the insulating shells and of the cryocontainer, respectively, is increased merely by the specific type of the meander-shaped winding and the forces resulting therefrom.

Two embodiments of the cryocontainer according to the invention are basically possible, wherein, in the first embodiment, the insulating shells are attached to the outer container and, in the second embodiment, the insulating shells are attached to the inner container. The former embodiment has advantages with regard to the insulating effect.

Further suitable variants are defined in the subclaims 22 to 39. Below, the invention is illustrated in further detail based on several exemplary embodiments which are schematically illustrated in the drawing. FIG. 1 shows a longitudinal section through a container taken along lines I-I of FIG. 3 according to a first embodiment, FIG. 2 shows detail II of FIG. 1, and FIG. 3 is a front view of the container in the direction of arrow III of FIG. 1.

Figure 2:
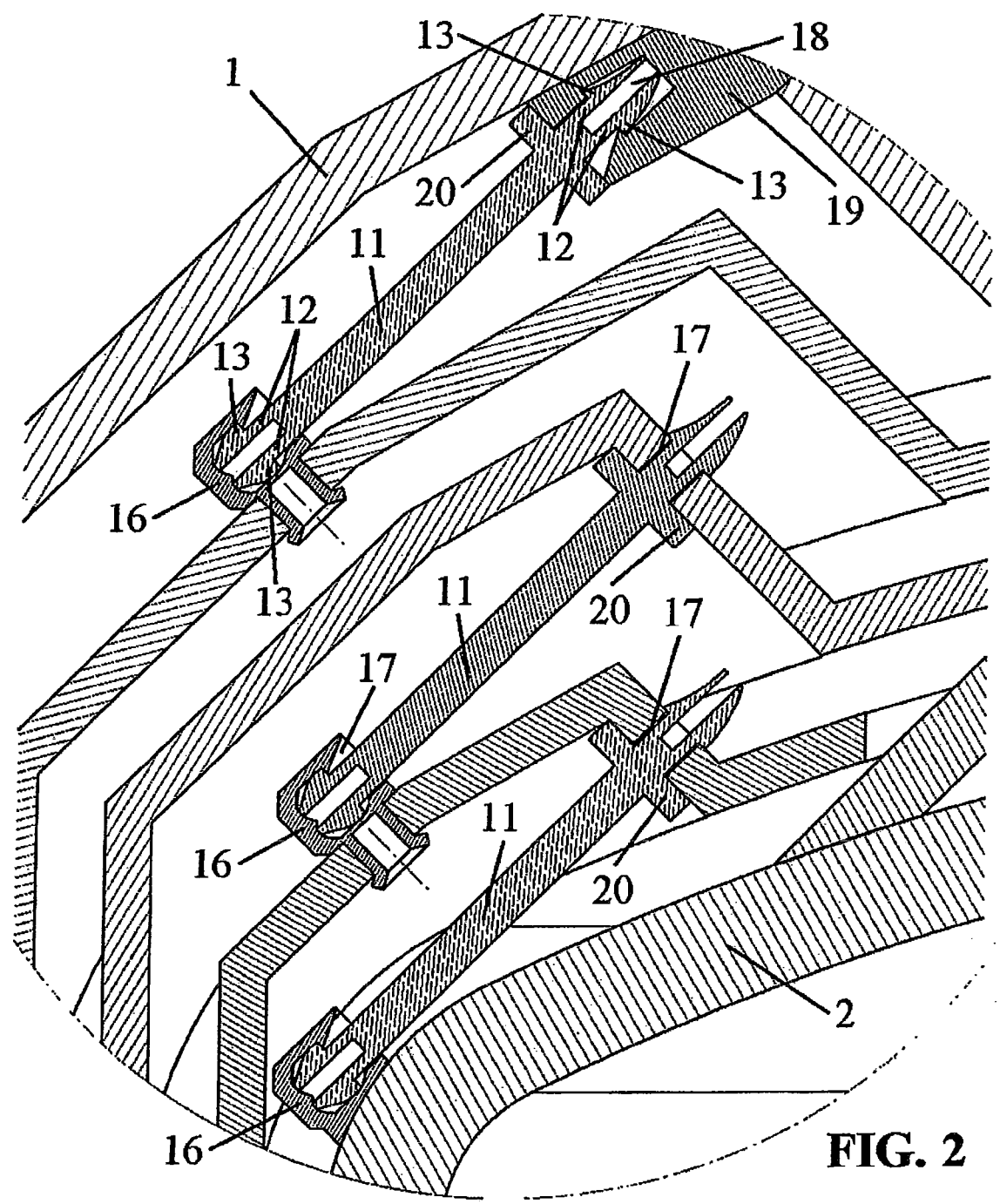
Figure 3:
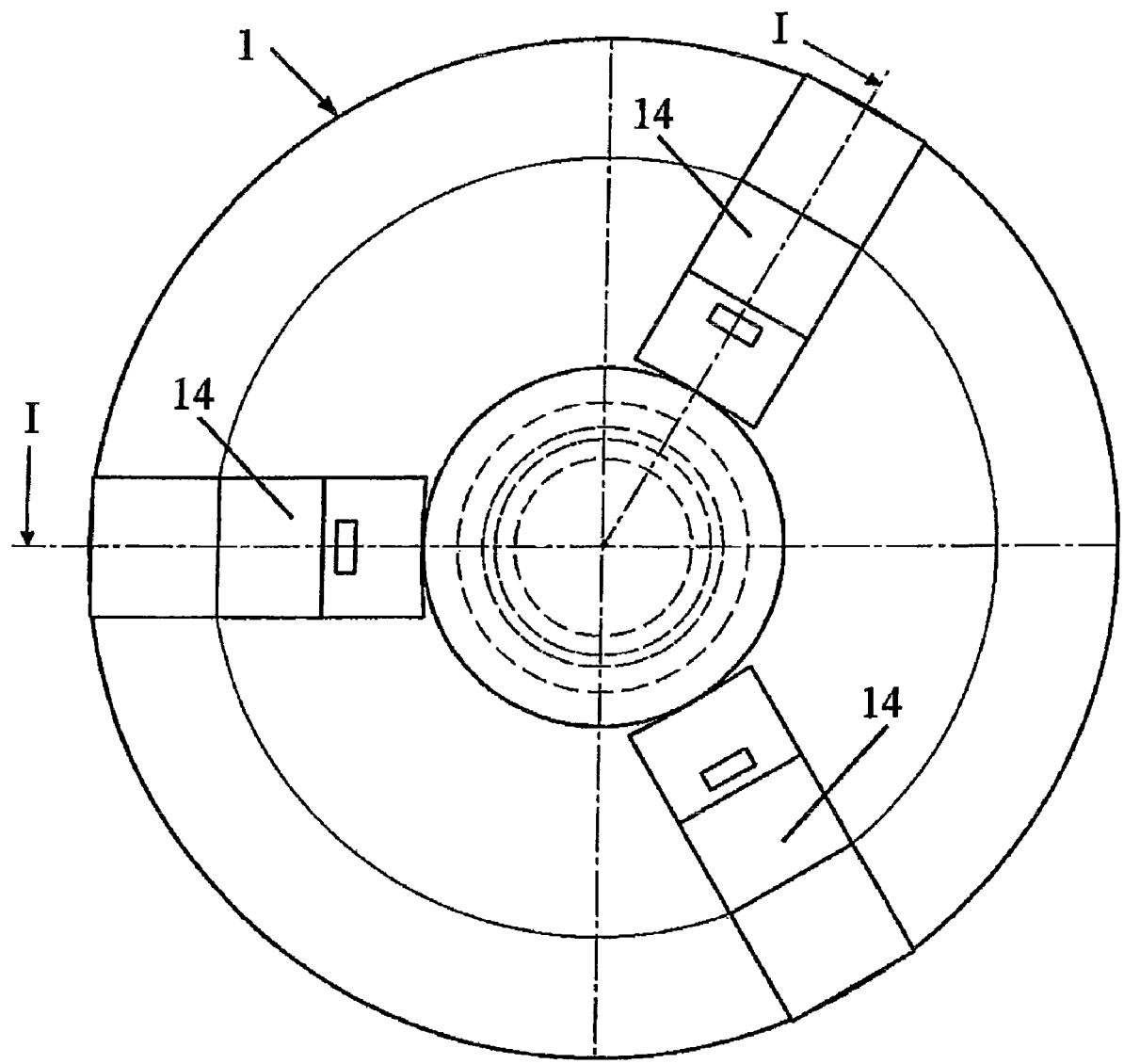
Figure 4:
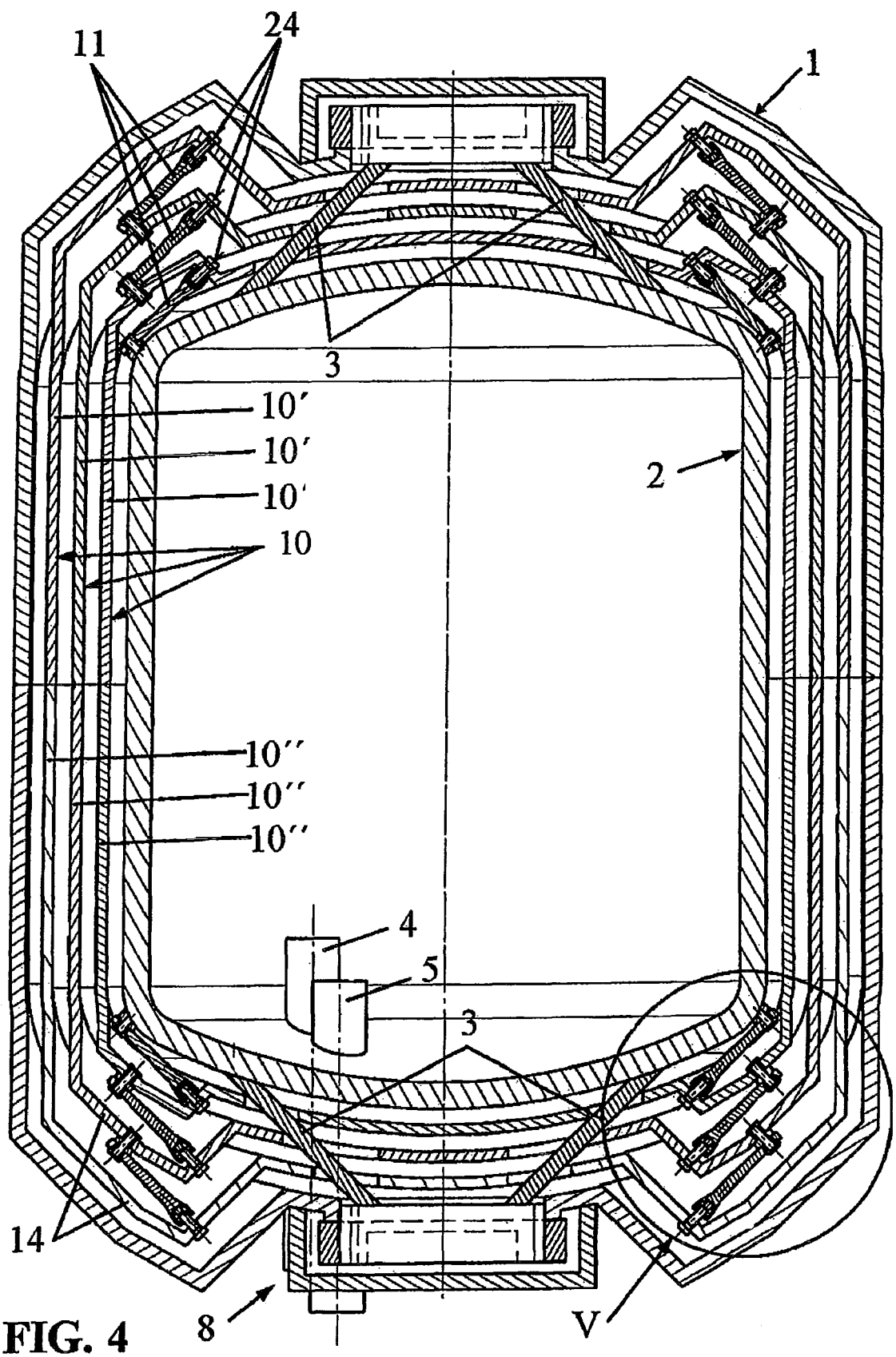
Figure 5:
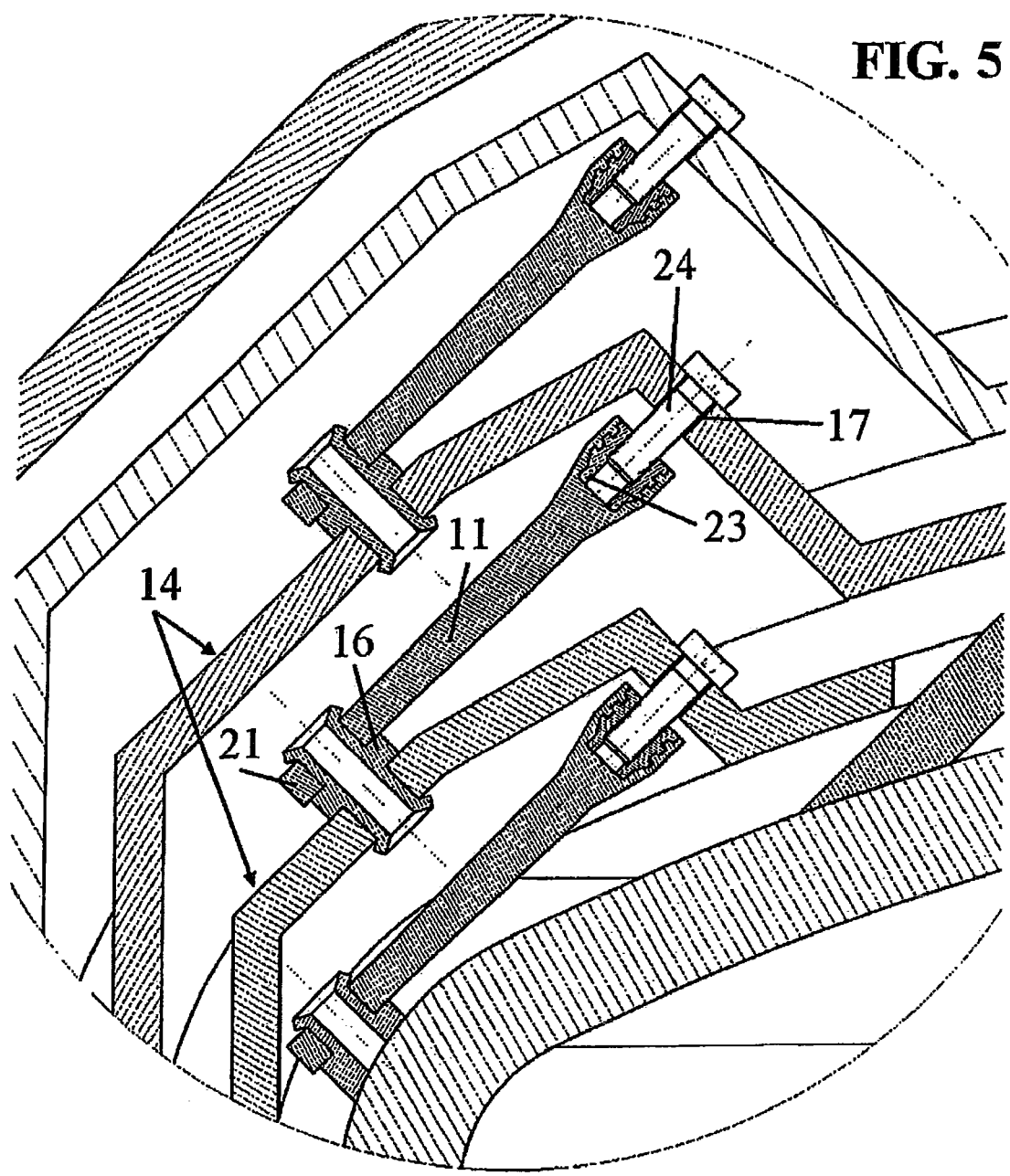
Figure 6:
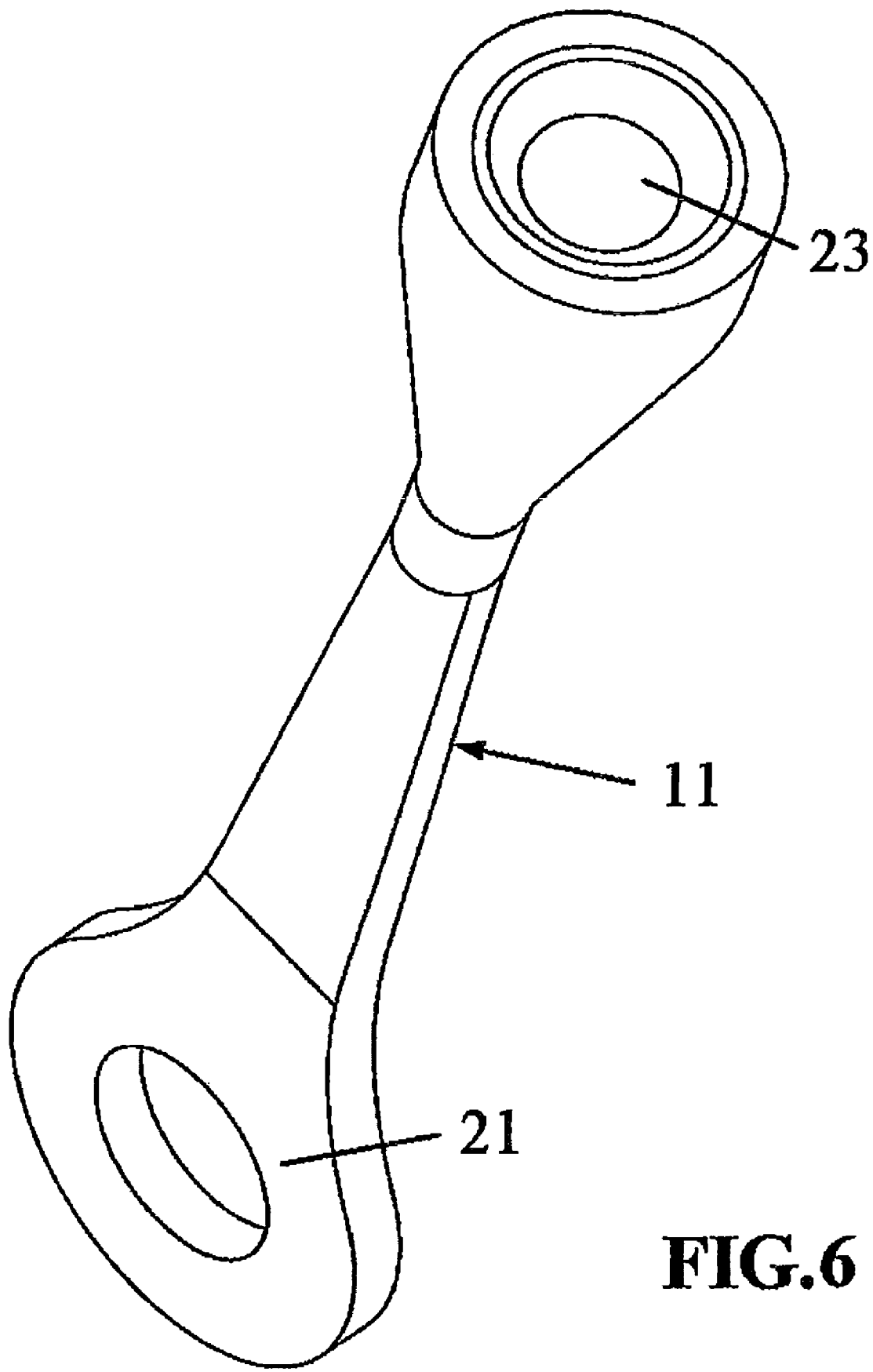
Figure 7:
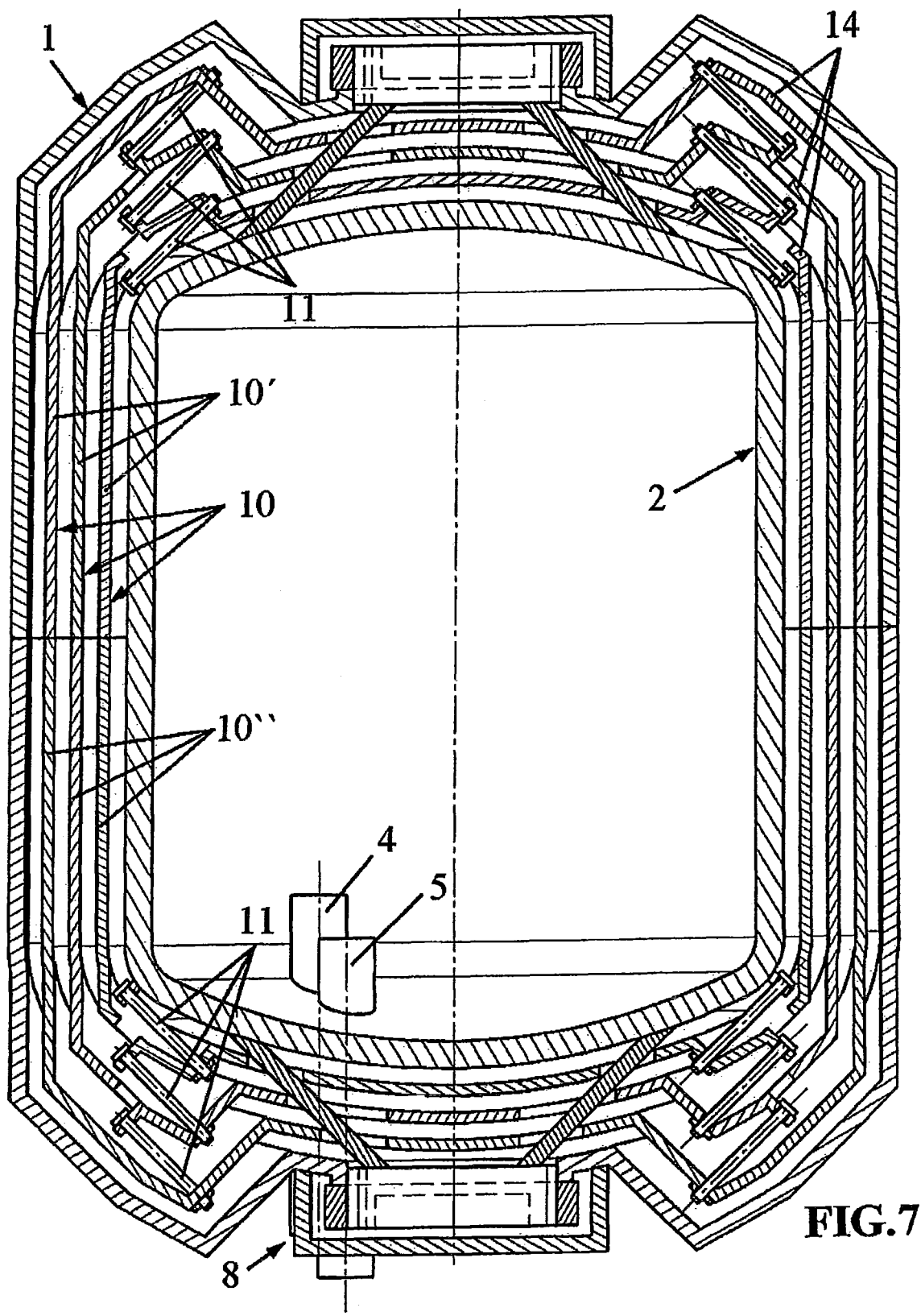
Figure 8:
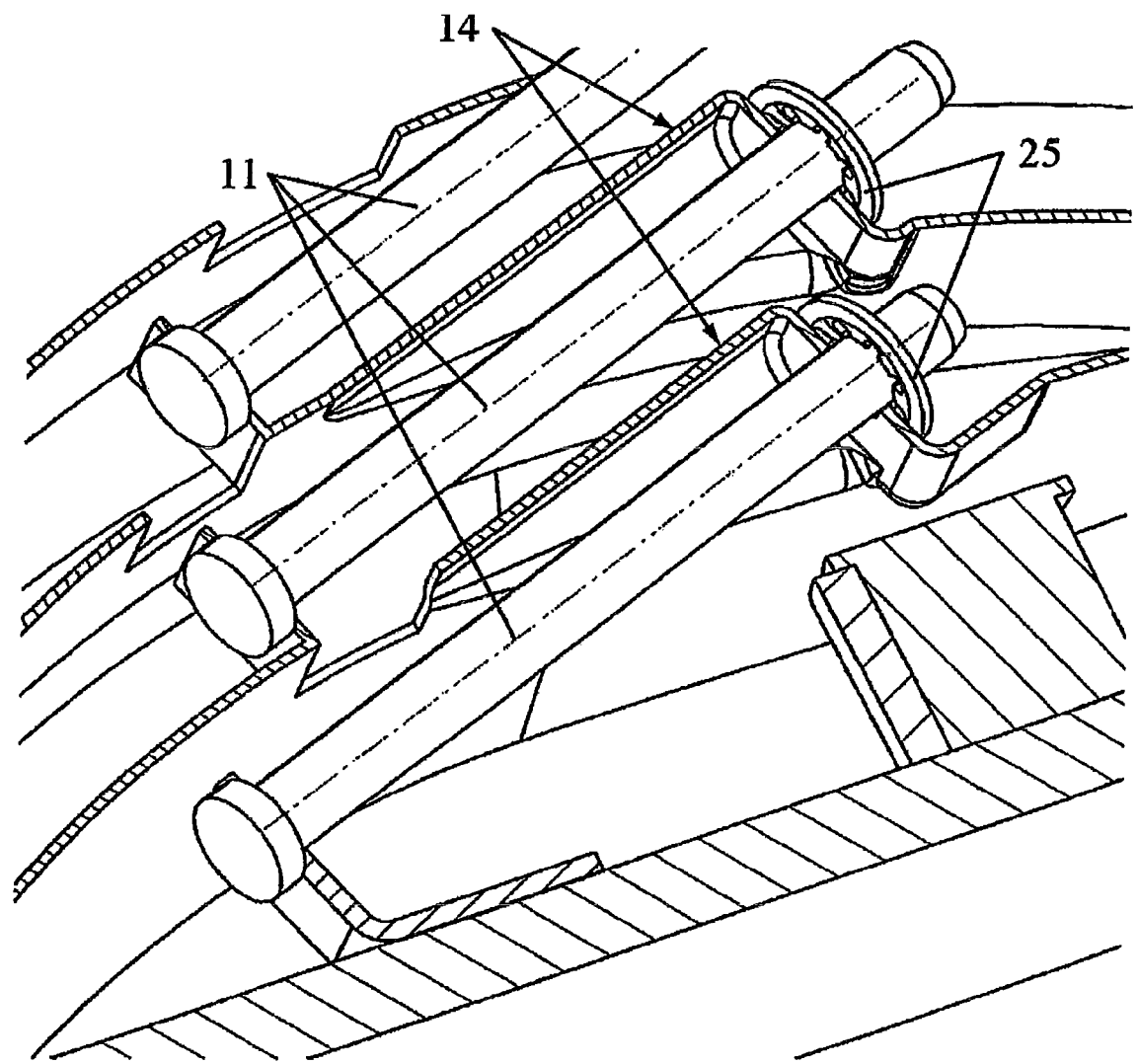
Figure 9:
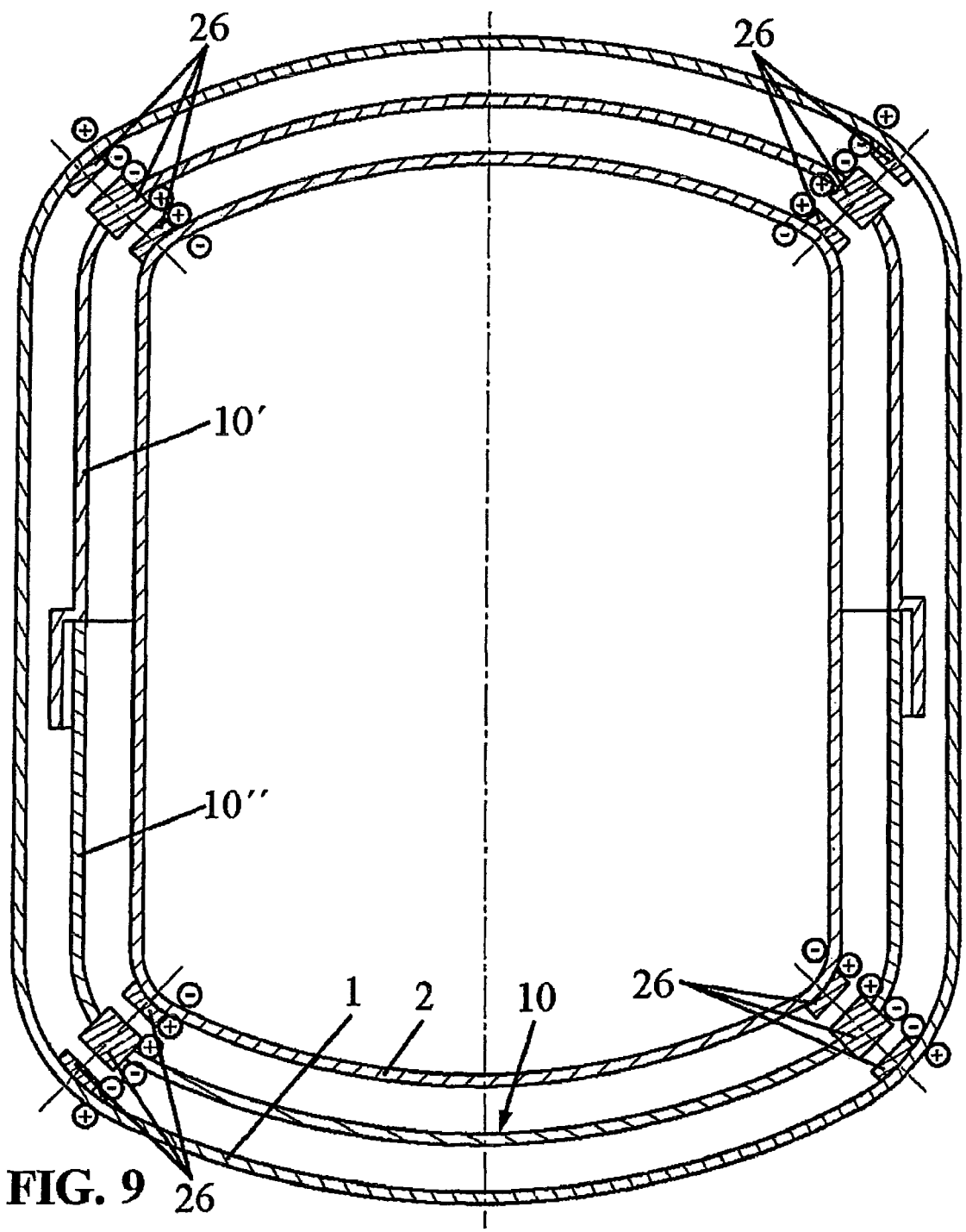
Figure 10:
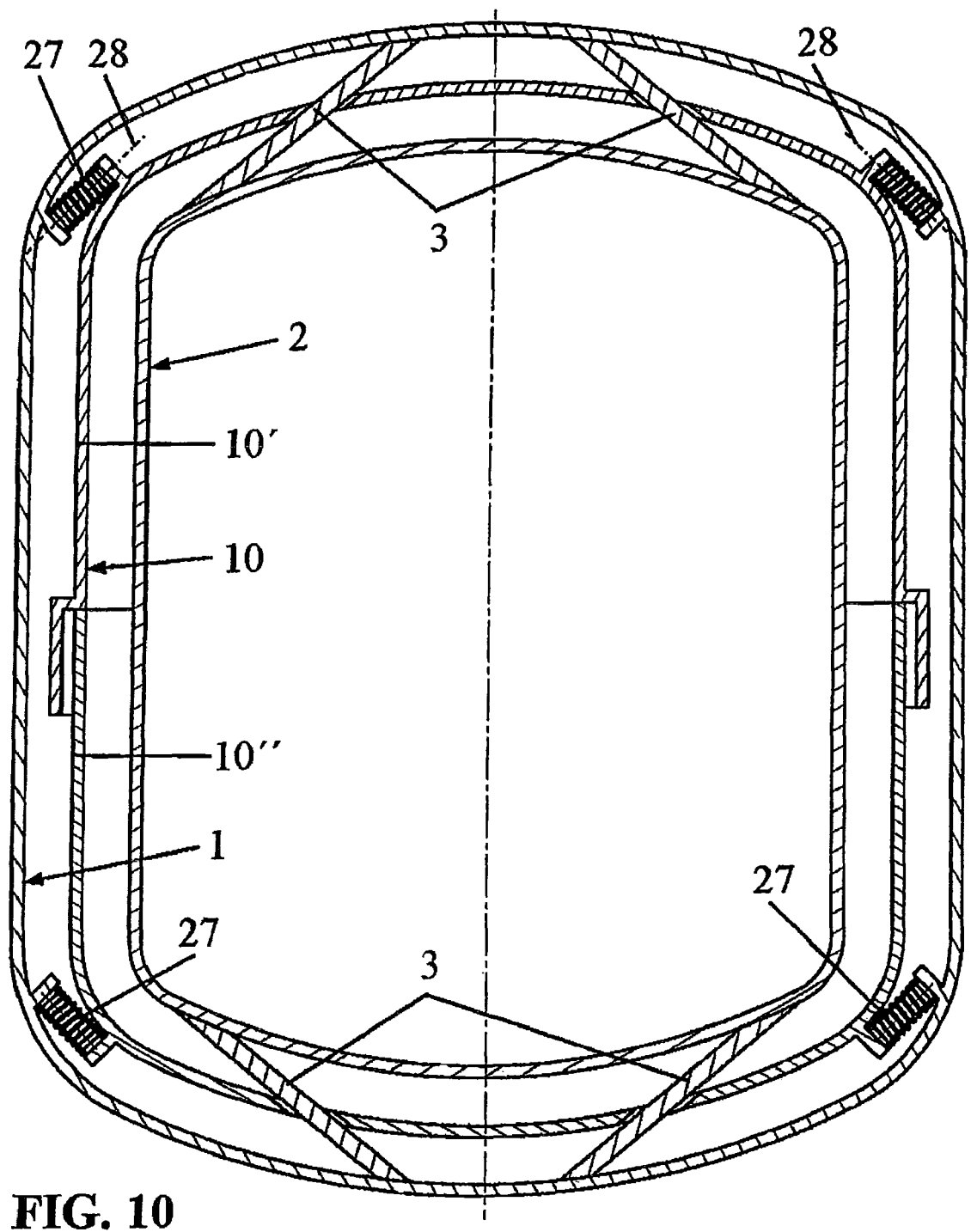
Figure 14:
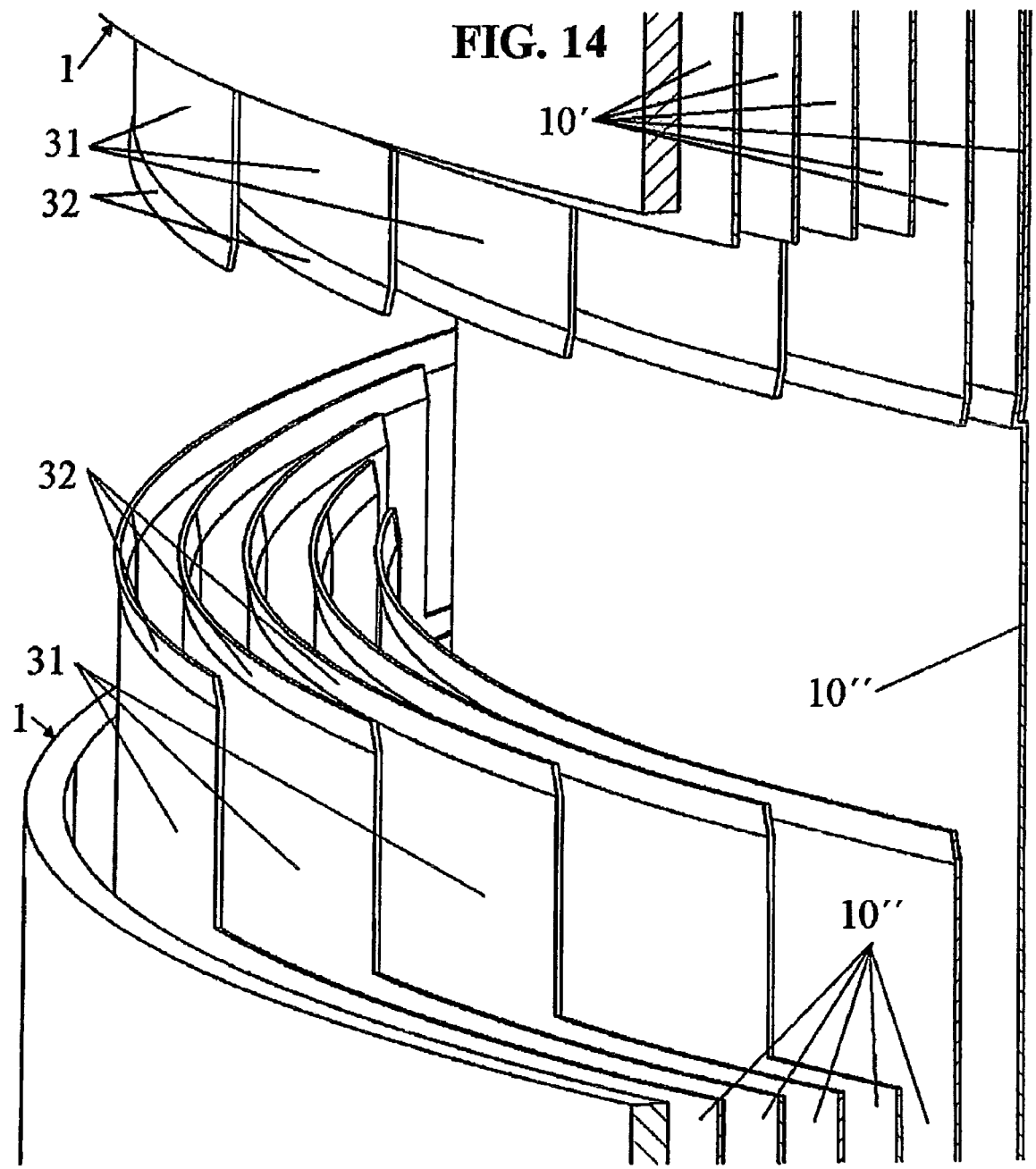
Figure 15:
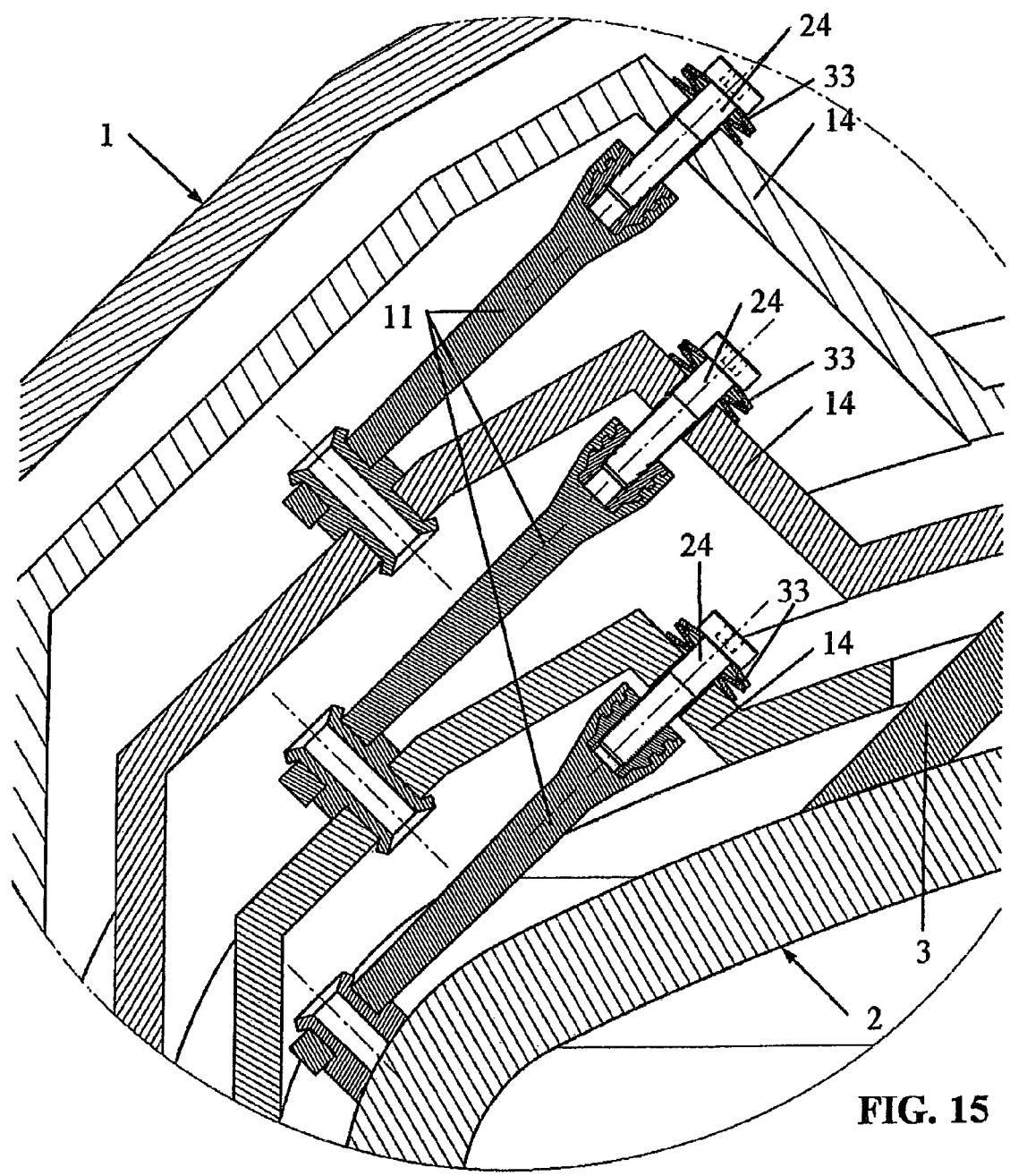
Figure 18:
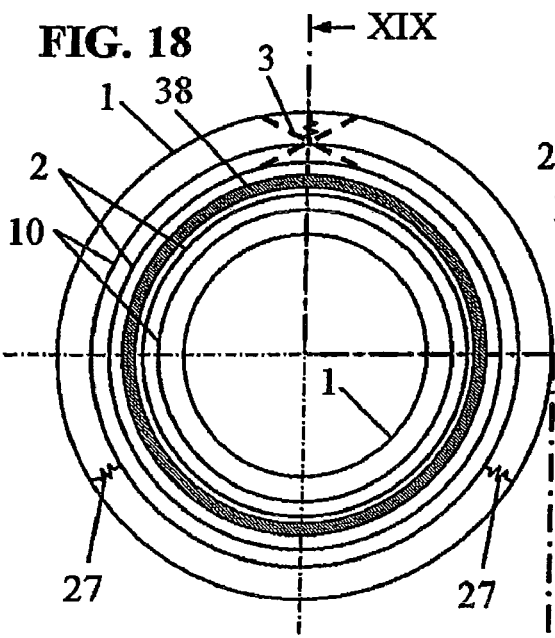
Figure 19:
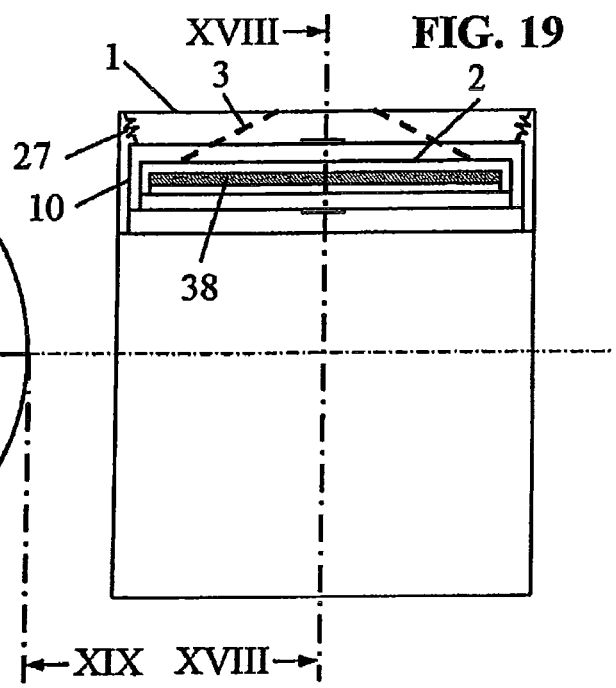
Figure 20:
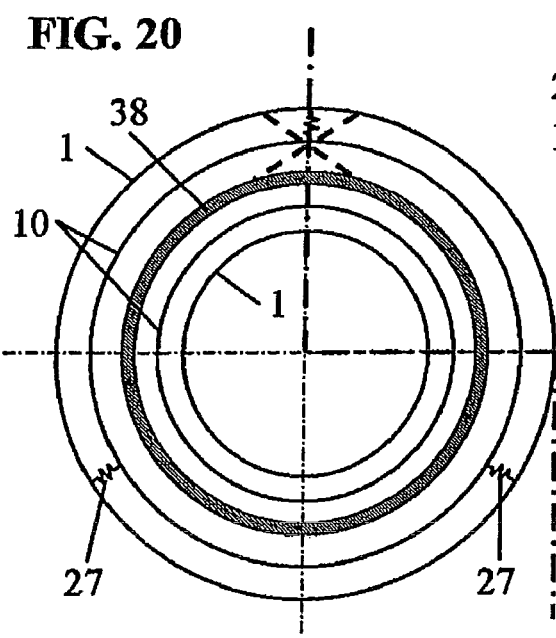
Figure 21:
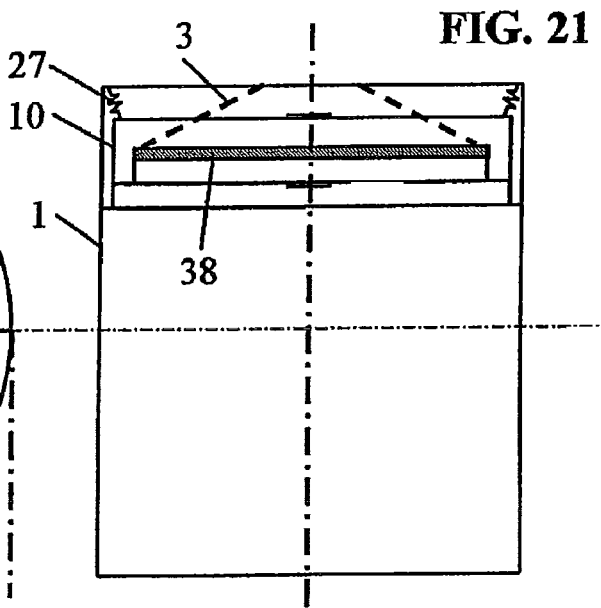
Figure 22:
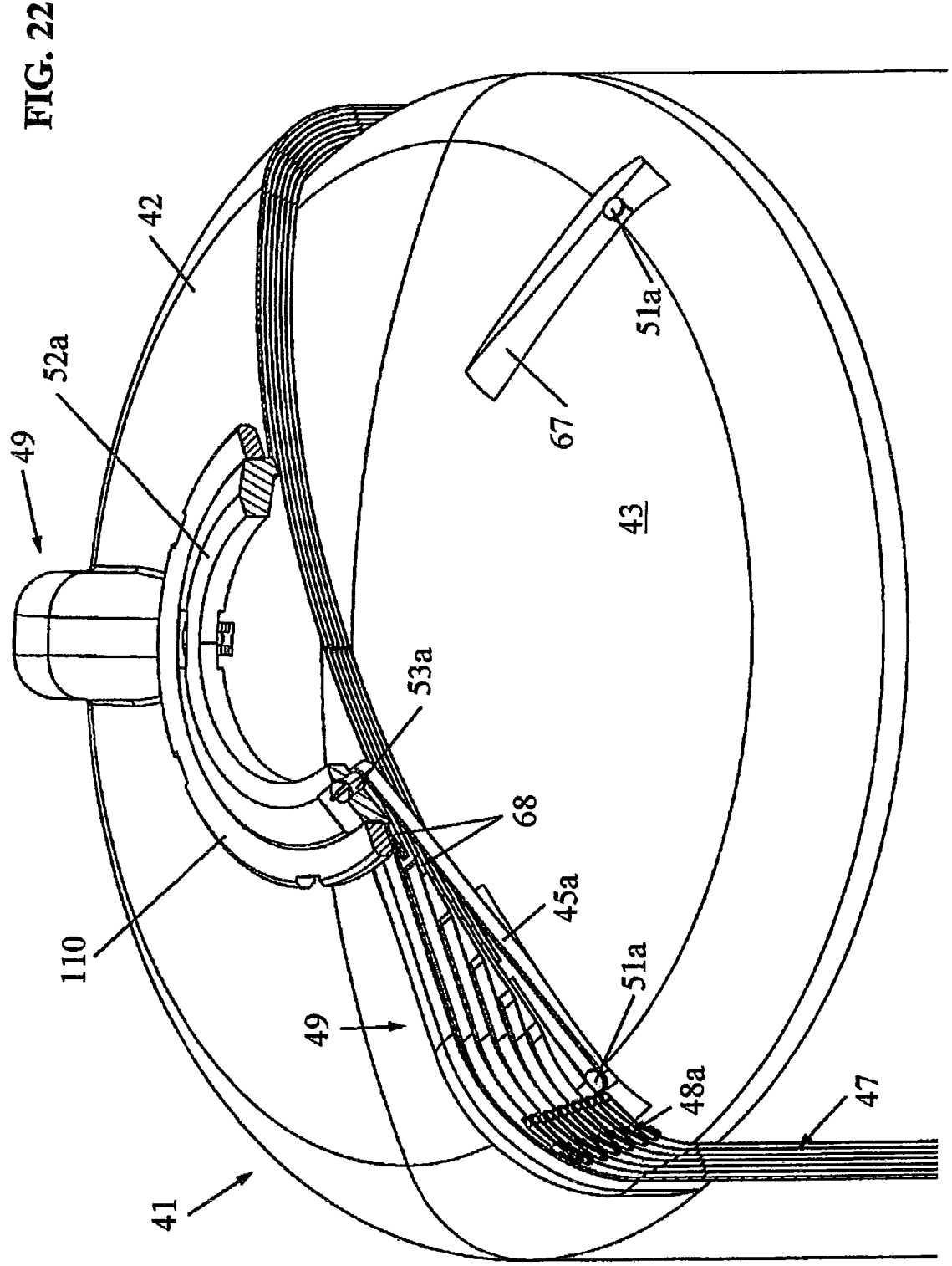
Figure 23:
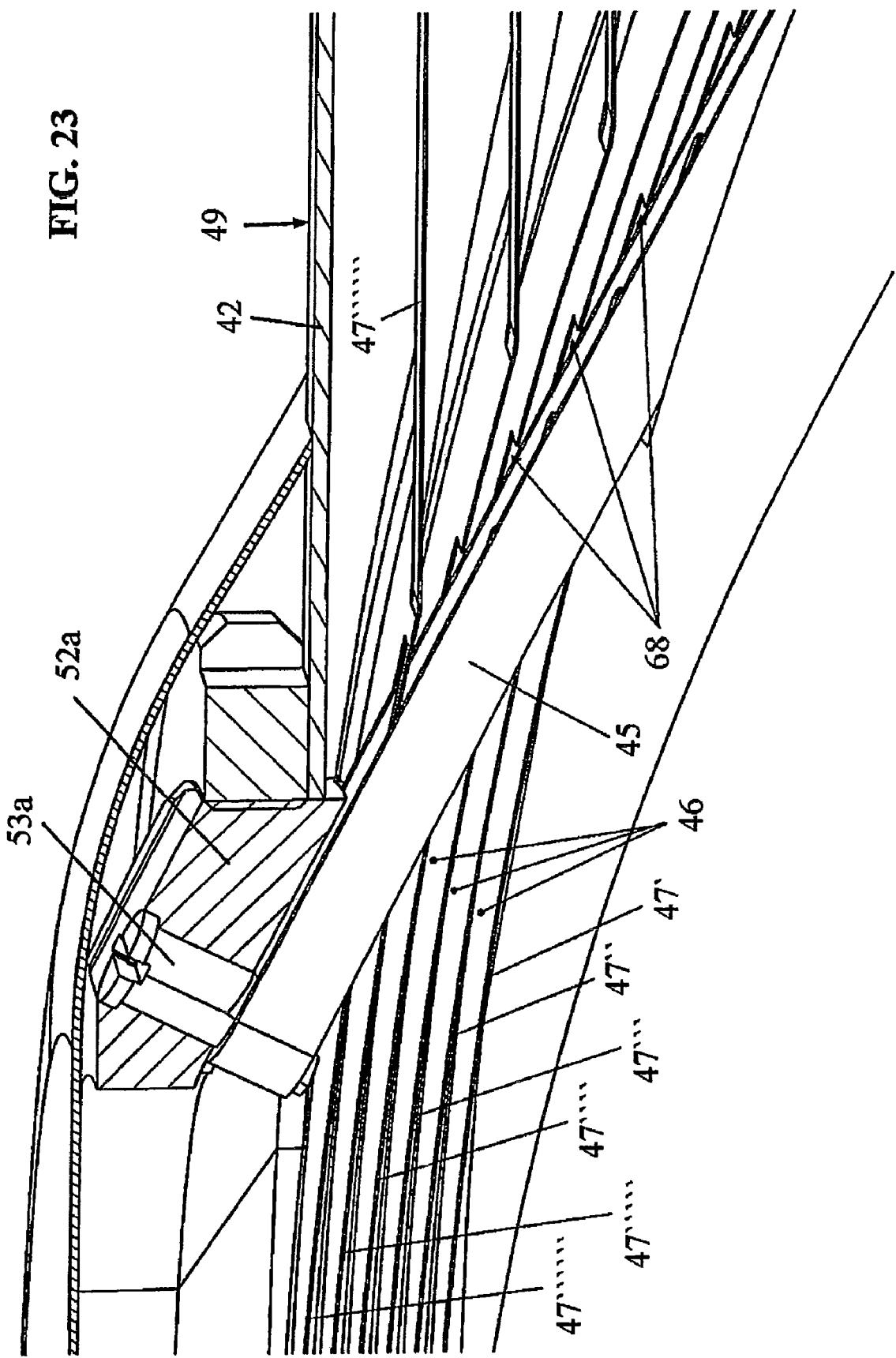
Figure 24:
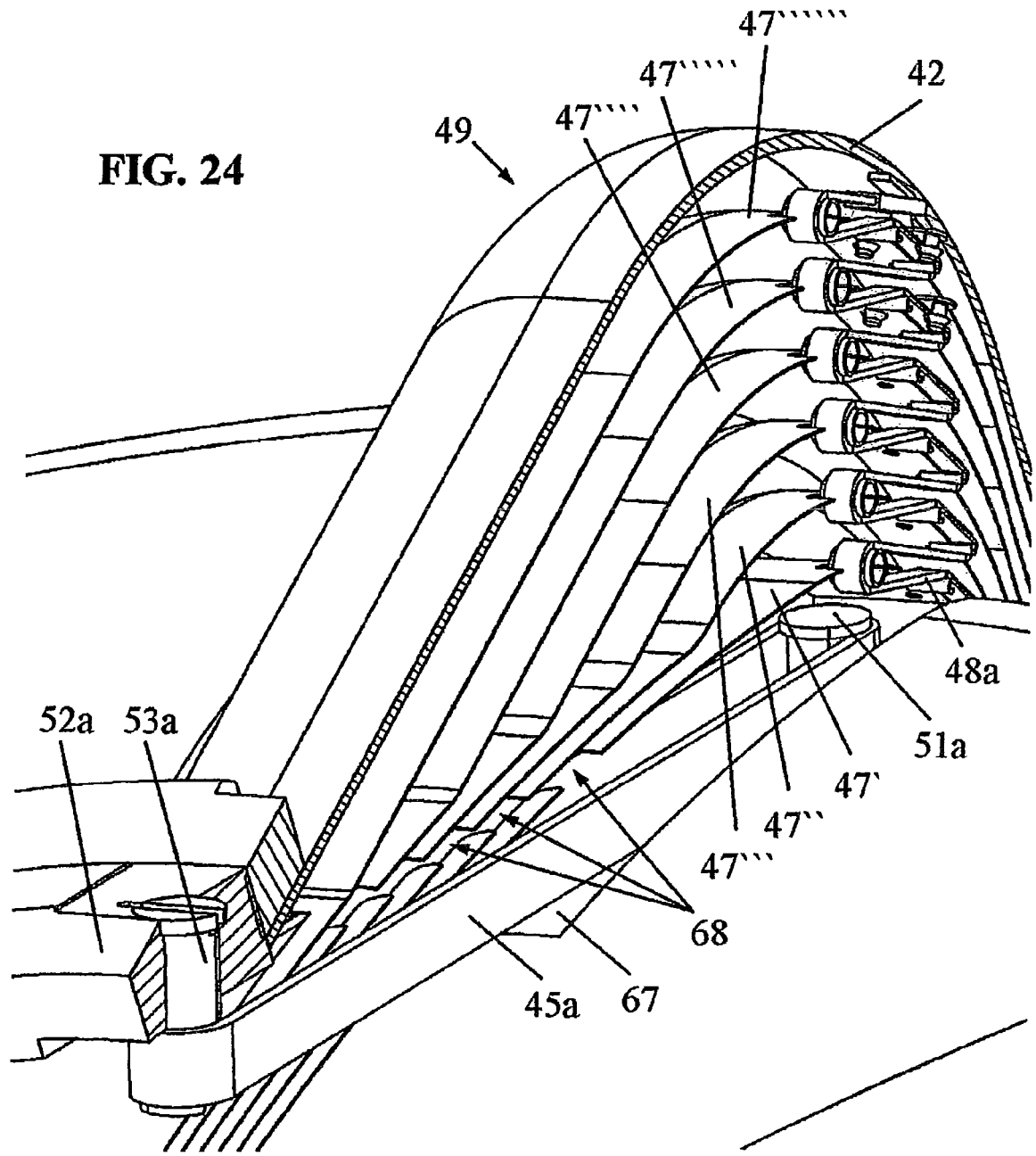
Figure 25:
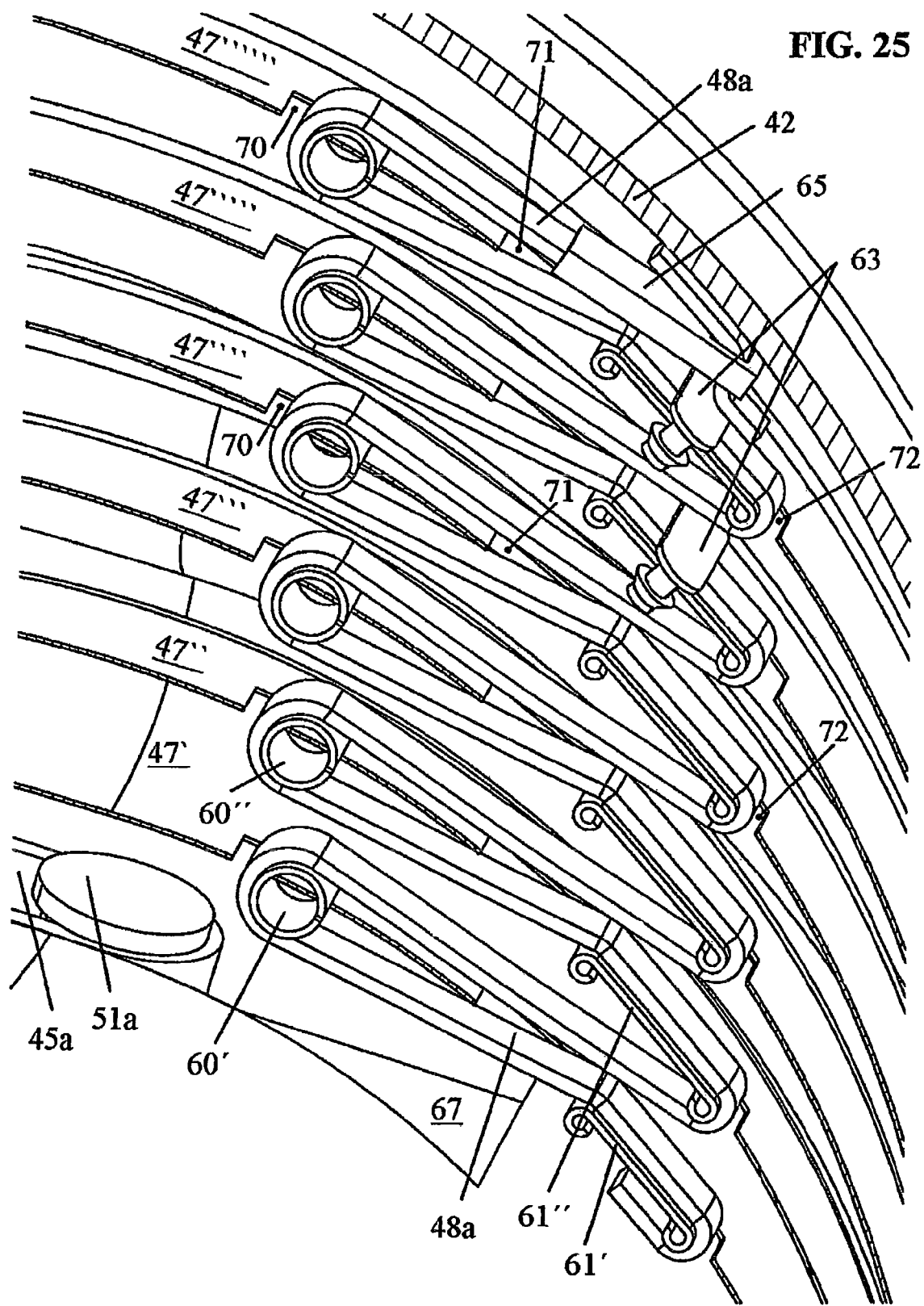
Figure 26:
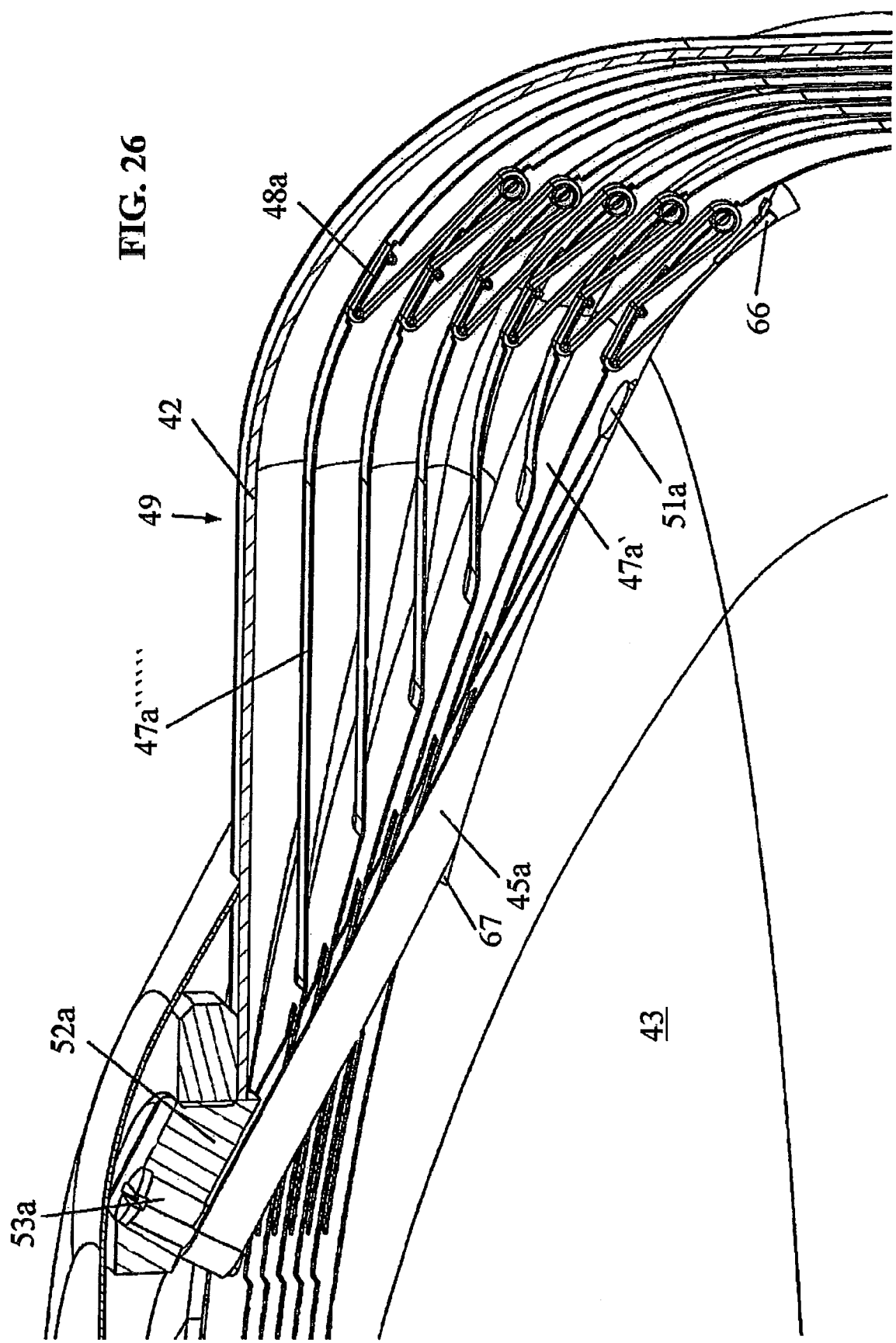
Figure 27:
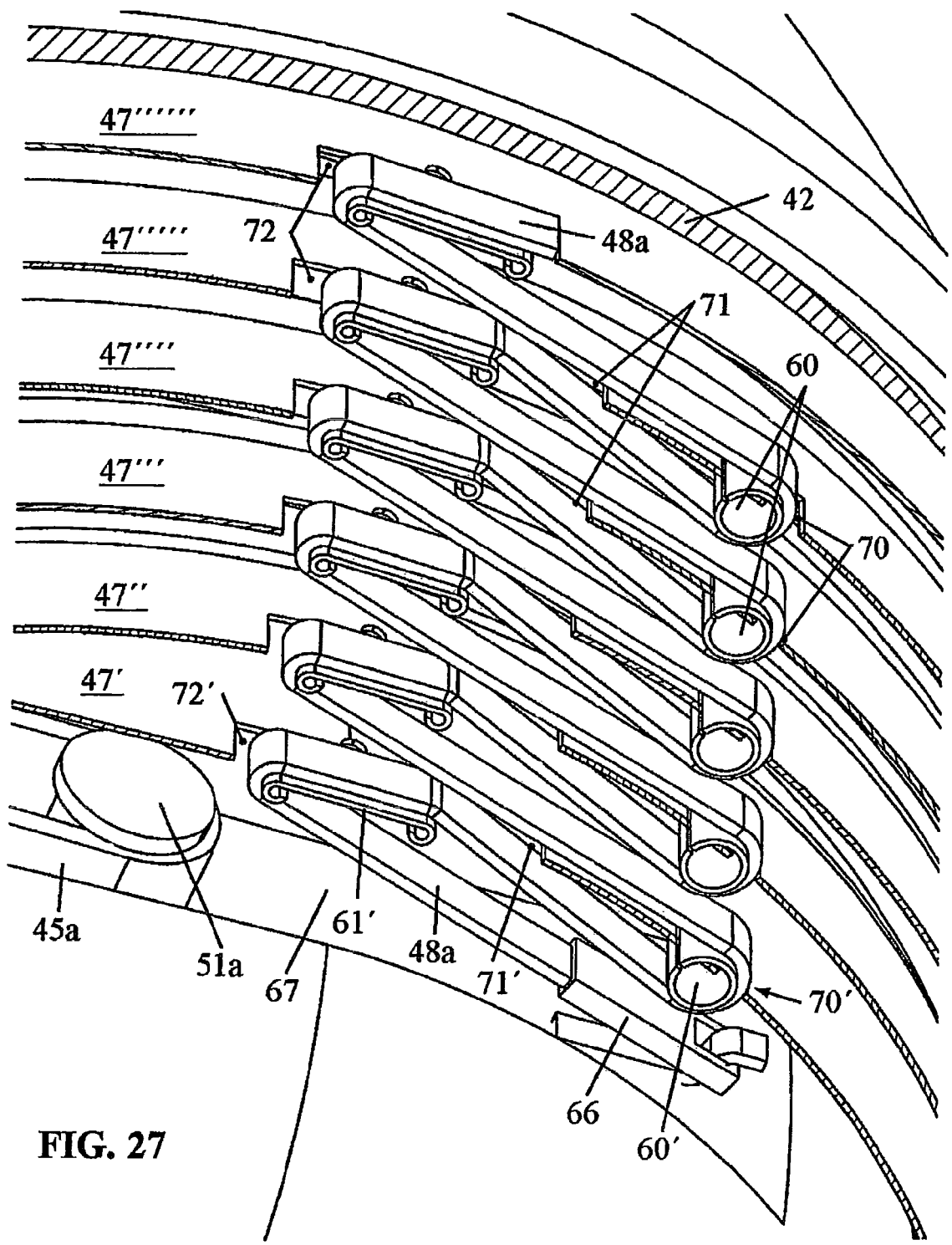
Figure 28:
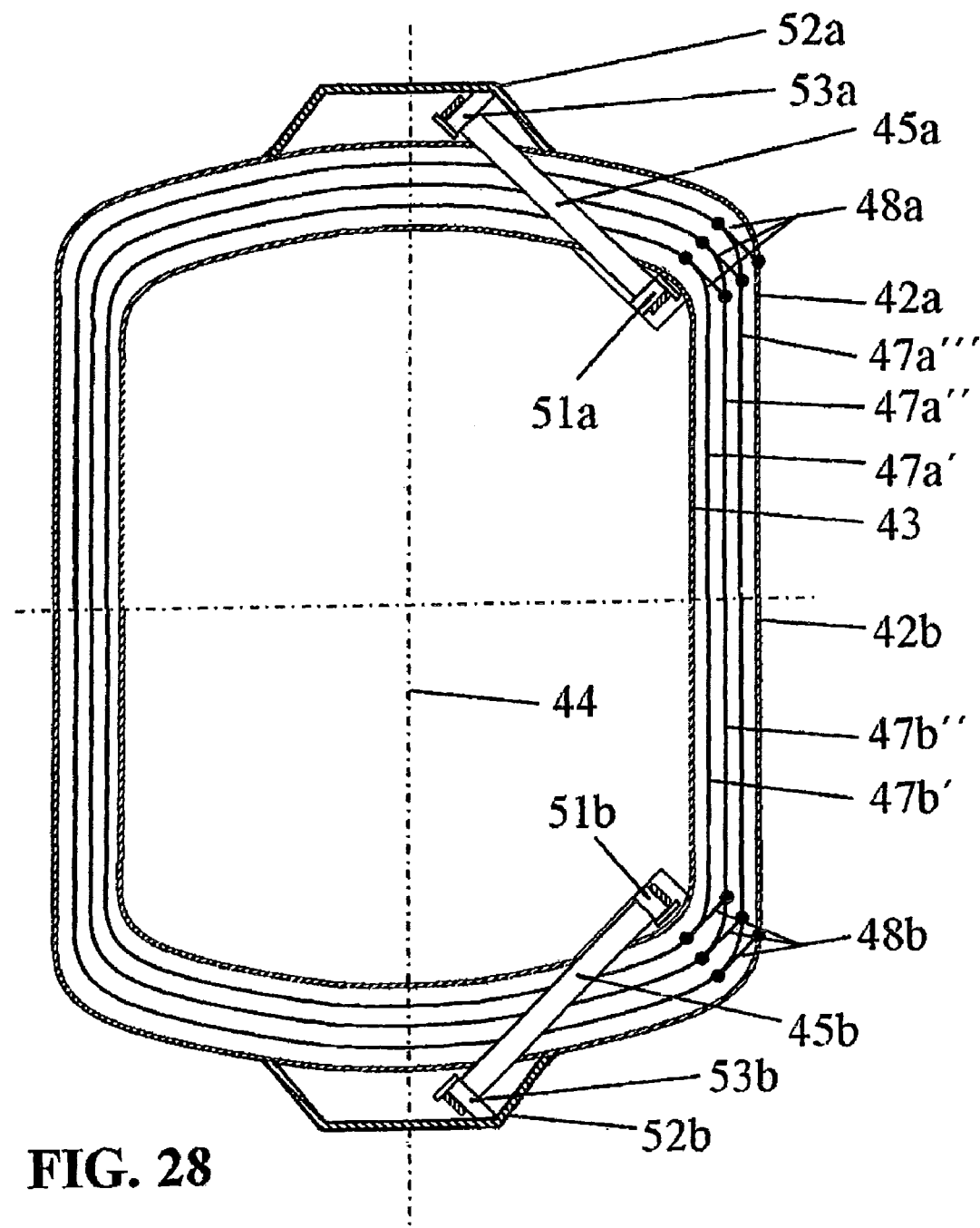
Figure 29:
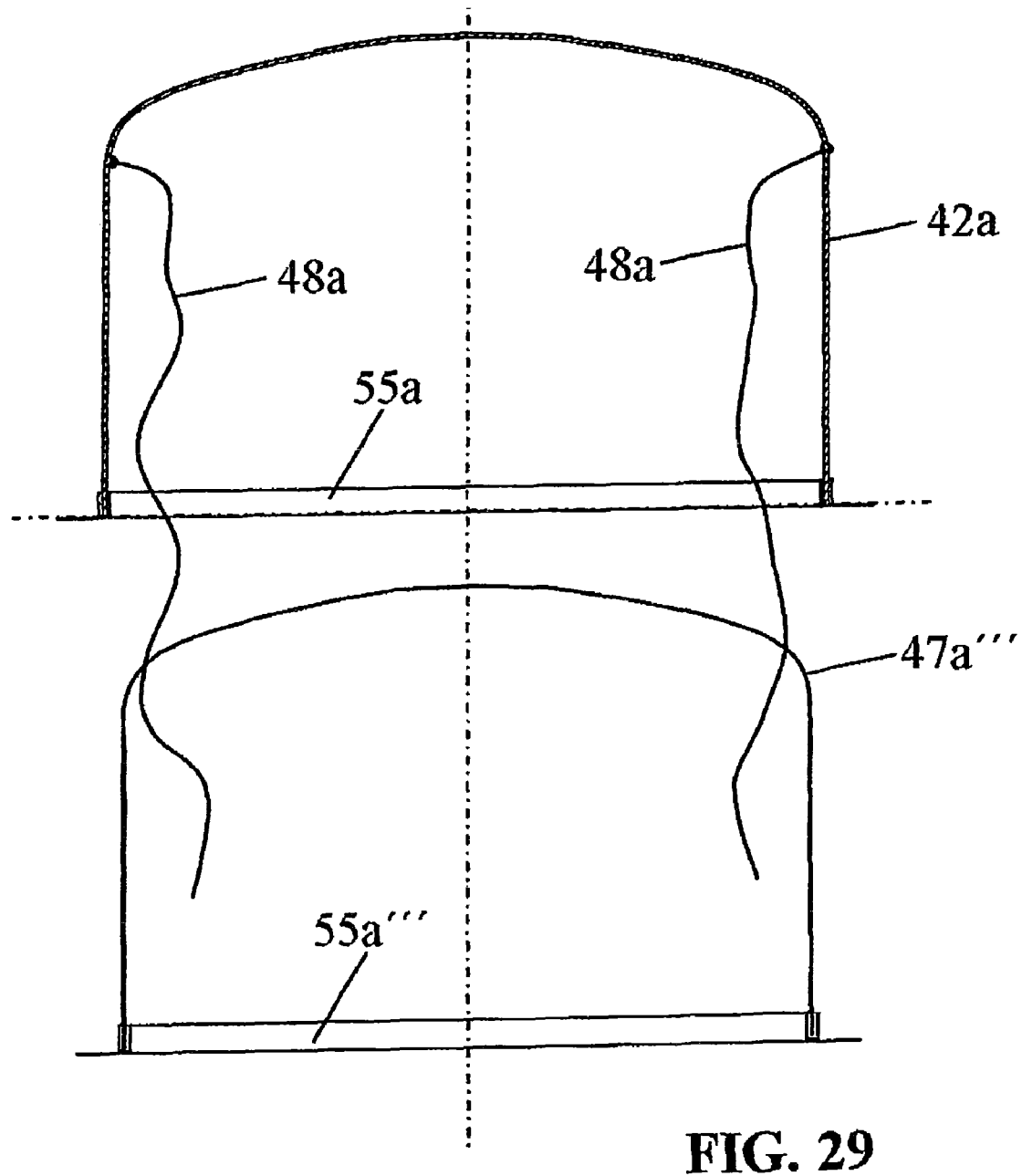
Figure 30:
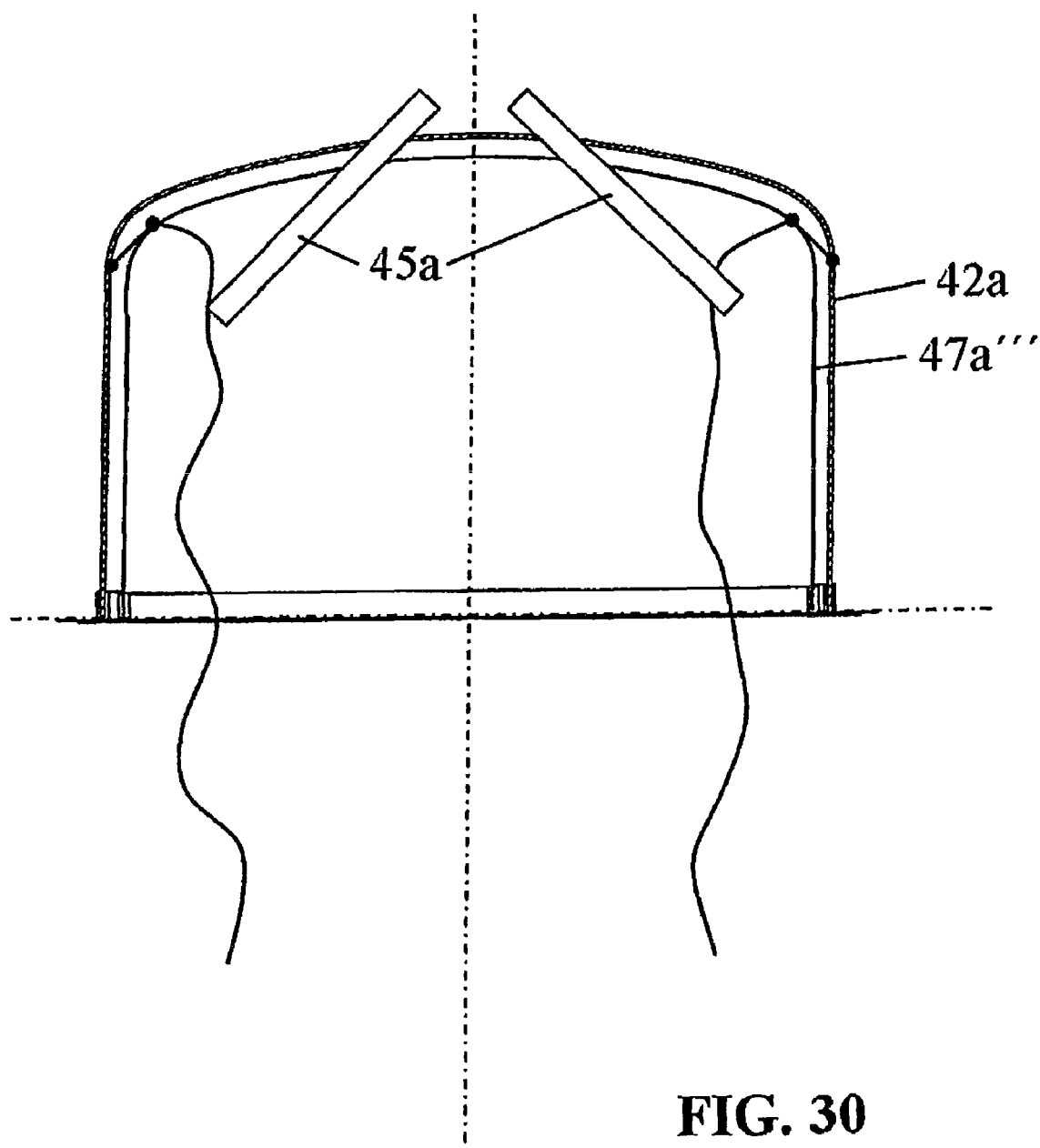
Figure 31:
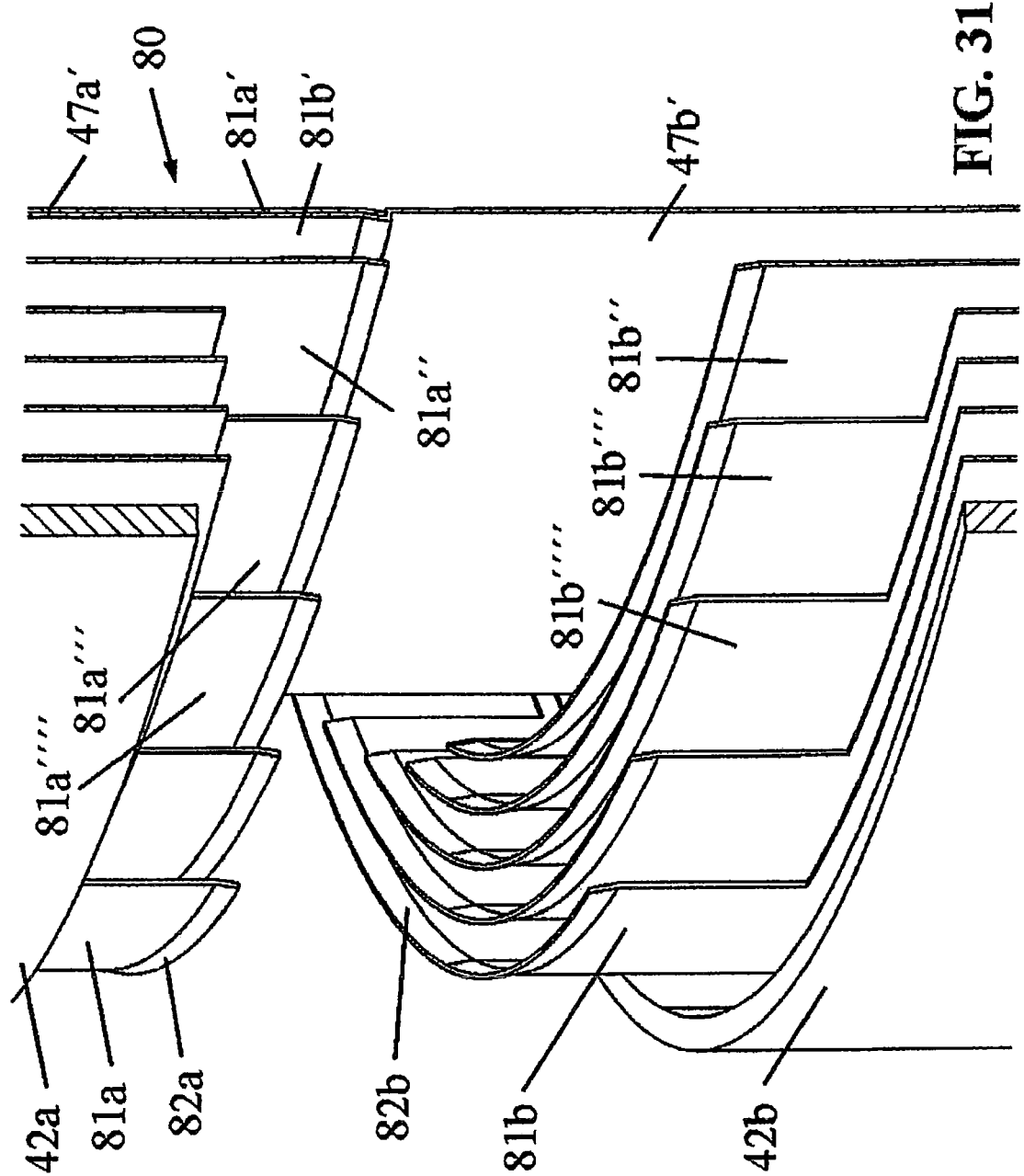
Figure 32:
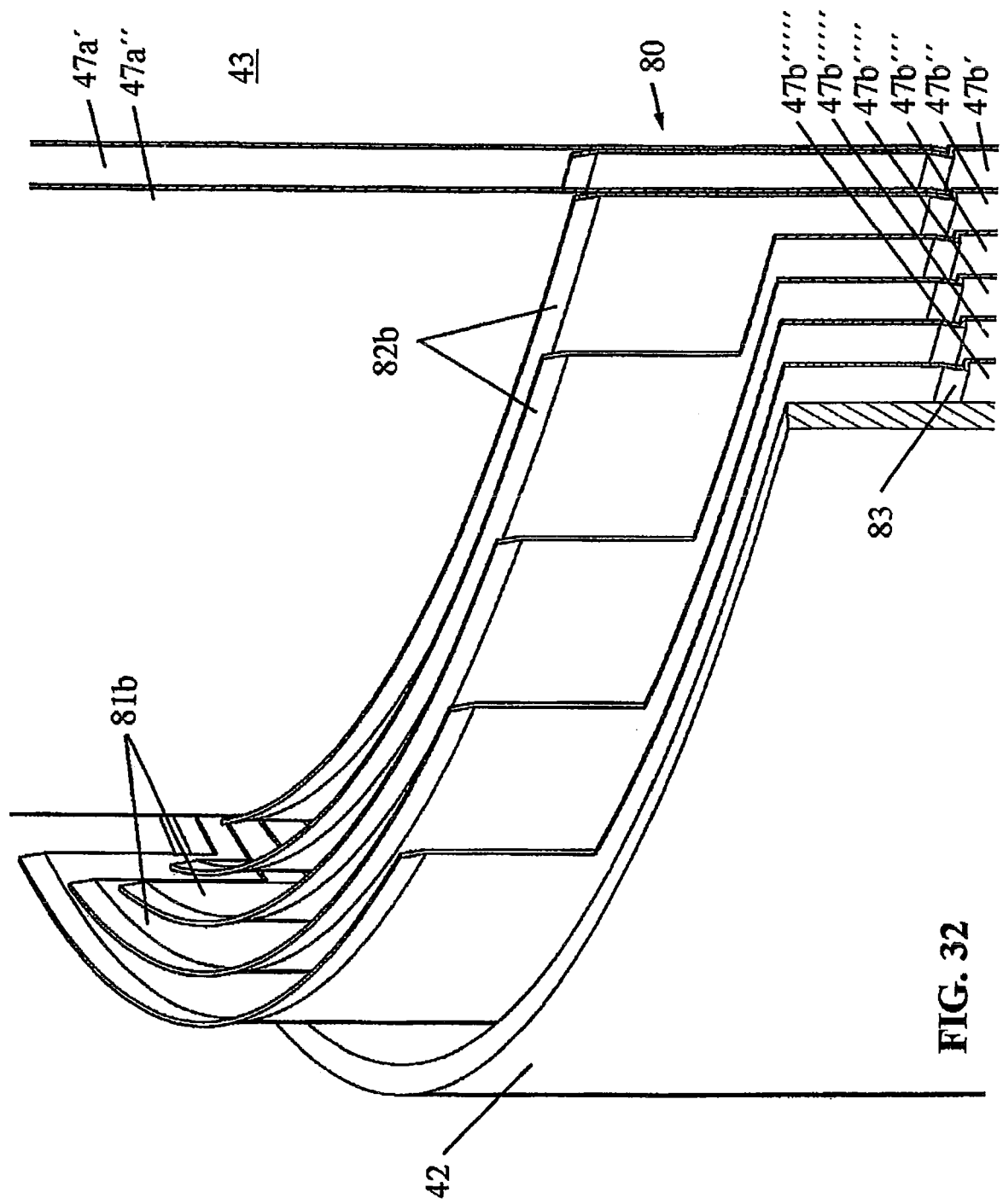
Figure 33:
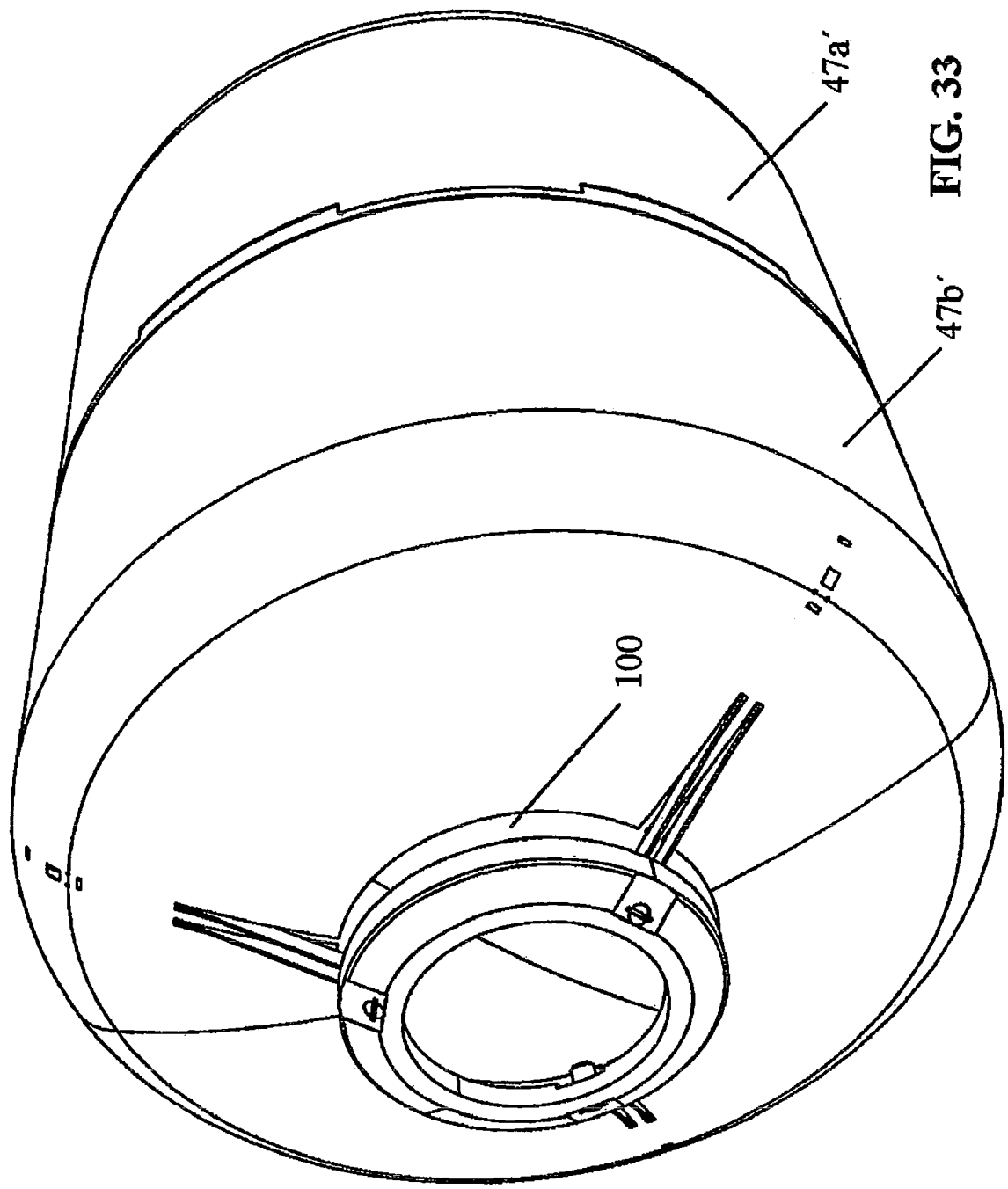
Figure 34:
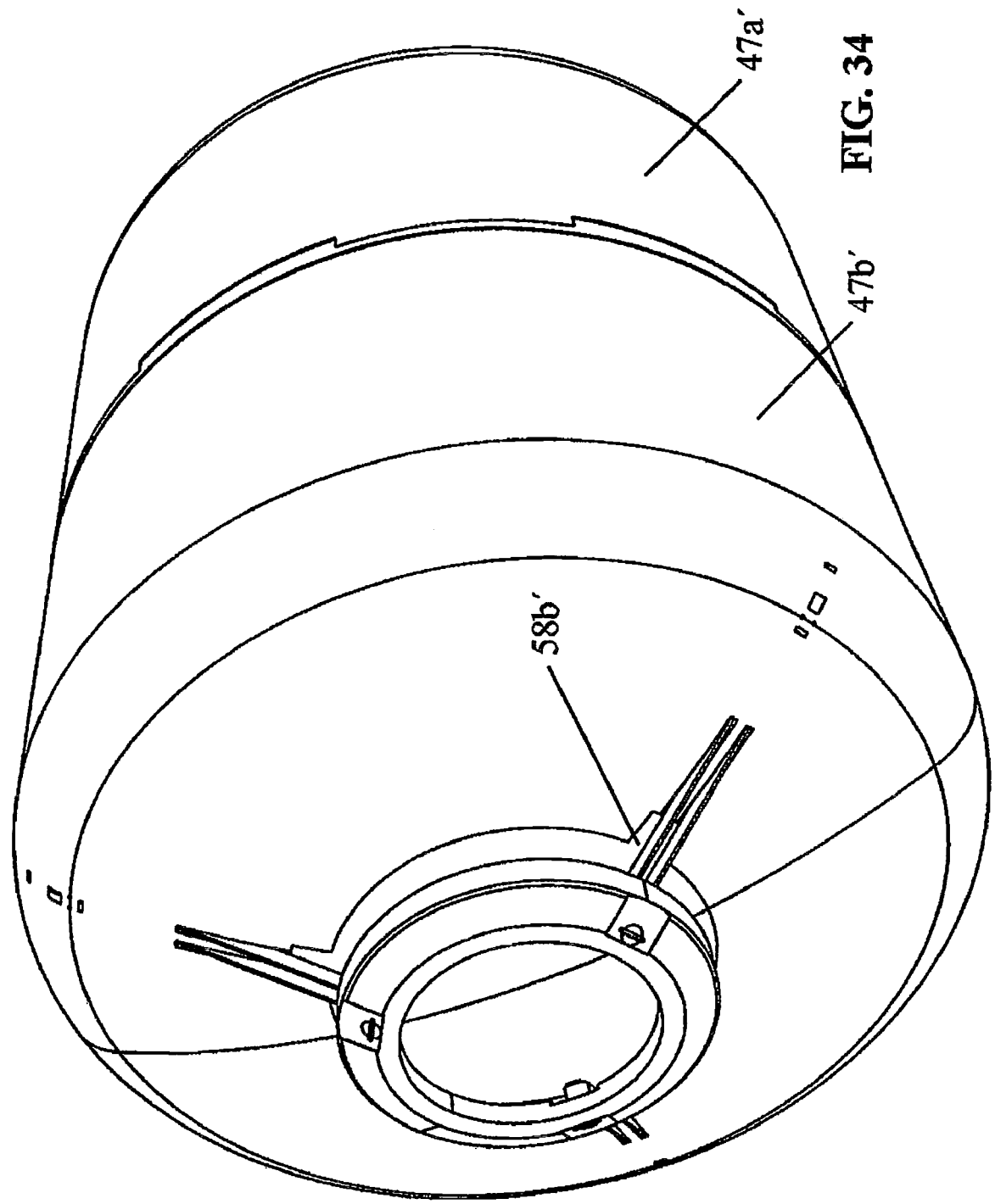
Figure 35:
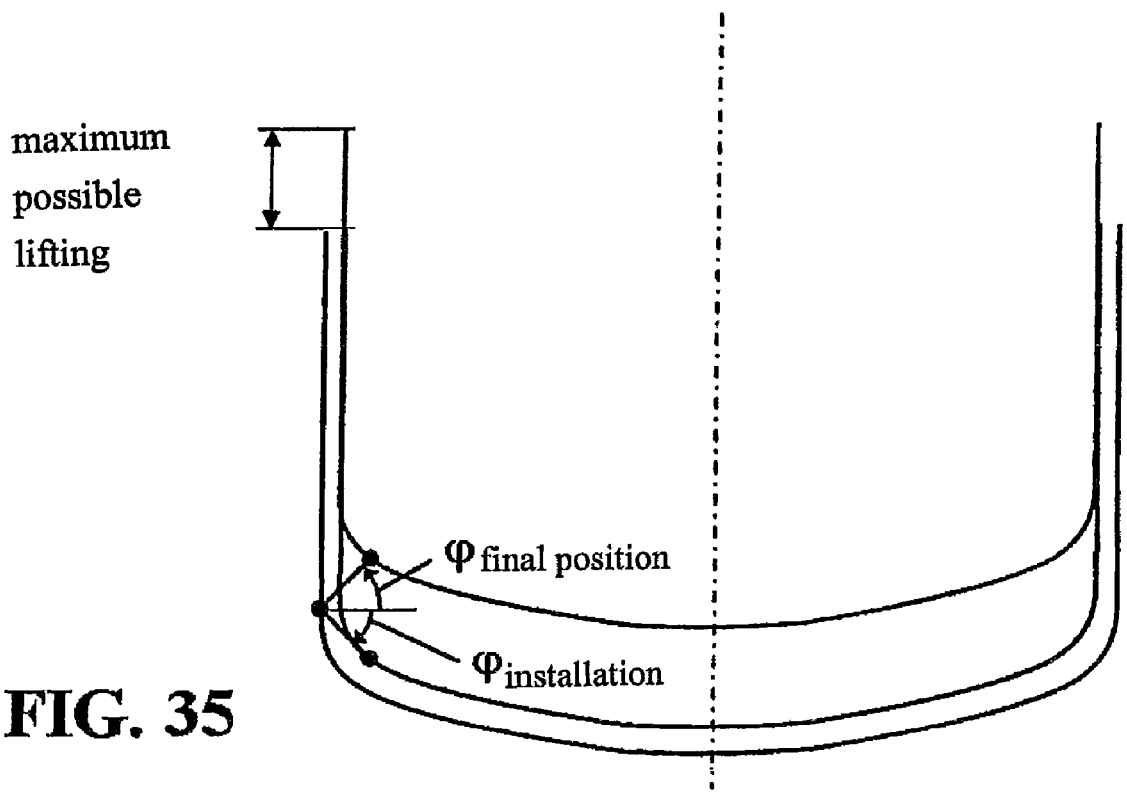

A further embodiment is explained in FIGS. 4 and 5 in illustrations analogous to FIGS. 1 and 2, wherein FIG. 5 illustrates a detail V of FIG. 4. FIG. 6 is an oblique elevation of a positioning element according to the embodiment of FIGS. 4 and 5. FIGS. 7 and 8 in turn show a further embodiment in illustrations analogous to FIGS. 1 and 2, wherein FIG. 8 illustrates an oblique elevation of a detail of FIG. 7. FIG. 9 shows an embodiment in a sectional illustration analogous to FIG. 1. Further variants are illustrated in FIGS. 10 and 11 also analogously to FIG. 1. FIG. 12 shows a detail in sectional view, FIG. 13 in top view. FIG. 14 shows the structure of individual parts of the insulating shells. FIG. 15 shows a variant of the embodiment according to FIG. 5 in an illustration analogous to FIG. 5, and FIG. 16 shows a variant of the embodiment illustrated in FIG. 10 in an illustration analogous to FIG. 5. FIG. 17 shows a component part of the variant according to FIG. 16. A container for storing a magnetizing coil is illustrated in FIGS. 18 and 19 in different sectional views. FIGS. 20 and 21 show a variant in an illustration analogous to FIGS. 18 and 19. FIG. 22 shows a perspective view of the upper half of an embodiment of a cryocontainer according to the invention, with the insulating shells attached to the outer container. FIG. 23 shows a detailed view of the first fastening elements according to FIG. 21. FIG. 24 shows a detailed view of the individual insulating shells of the cryocontainer according to FIG. 21. FIG. 25 shows a detailed view of the attachment of the individual insulating shells. FIG. 26 shows an alternative embodiment of the cryocontainer, with the insulating shells attached to the inner tank. FIG. 27 shows a detailed view of the insulating shells attached to the inner tank according to FIG. 26. FIGS. 28, 29 and 30 show the sequence of a process for assembling the cryocontainer according to FIG. 21. FIGS. 31 and 32 show the structure of the individual partial shells of the insulating shells. FIGS. 33 and 34 show procedural steps in the assembly of still a further variant. FIG. 35 shows a specific procedural step during installation.

The cryotank depicted in longitudinal section in FIG. 1 and having an essentially cylindrical design comprises an outer shell 1 in which an inner shell 2 is provided at an equidistance. Said inner shell is connected to the outer shell 1 in a positionally stable manner via fastening elements 3 (magnets are conceivable as well). For filling and emptying, two pipes 4, 5 penetrate through the outer and inner shells at a frontal end of the cryotank. The fastening elements 3 extend along the two front sides 7, 8 of the cryotank from the inner shell to the outer shell in an arrangement inclined toward the longitudinal axis 6 of the cryotank.

In the space 9 between the outer shell and the inner shell, which may be evacuated, insulating shells 10 are provided—three in the illustrated exemplary embodiment, however, only one insulating shell 10 or an arbitrary plurality might also be provided. In order to prevent contacts between the insulating shells 10 and the inner and outer shells 1, 2, the insulating shells 10 each composed of two halves 10' and 10"—the plane of osculation is located approximately in the centre of the length of the longitudinal axis 6 and extends transversely thereto—are fastened to the inner shell 2 or the outer shell 1 or to a further insulating shell 10, respectively, via positioning elements 11.

The positioning elements 11—which are designed as bolts—are provided in such a way that forces clamping the two parts 10' and 10"—in the following also referred to as half shells 10', 10"—of the insulating shell 10 against each other are produced via the positioning elements 11. According to the exemplary embodiment illustrated in FIG. 1, via the positioning elements 11 by means of which the innermost insulating shell 10 is attached to the inner shell 2, forces pressing the parts 10' and 10" of said insulating shell 10 against each other are caused by tensile forces acting in the positioning elements 11, whereas the parts 10' and 10" of the outermost insulating shell 10', which is provided adjacent to the outer shell 1, are loaded with forces pressing against each other via compressive forces acting in the positioning elements.

As can be learnt in particular from FIG. 2, the positioning elements are formed from bolts the ends of which are connected to the inner shell 2 or the outer shell 1 or the insulating shells 10, respectively, with snap connections formed from snap-in lugs 13 arranged on flexible tongues 12. The arrangement of the positioning elements 11 is likewise envisaged to be inclined toward the longitudinal axis 6 of the cryotank so that the positioning elements, which actually cause a direct contact between the inner shell 2 and the insulating shells 10 or the outer shell 1 and the insulating shells, respectively, can be dimensioned as long as possible, whereby heat transfer is minimized. For this purpose, bulges 14 extending alongside the positioning elements 11 are additionally provided on the outer shell 1 at the locations of the positioning elements 11 and also on the insulating shells 10 just at those locations. As a result of this, it becomes possible to provide very long positioning elements 11 despite a very small distance or gap 15, respectively, between the inner shell 2 and the first insulating shell 10 or between the insulating shells 10 or between the outer shell 1 and the insulating shell 10 adjacent thereto, respectively.

The positioning elements 11 themselves are snapped in each case with one end into openings 17 of inserts 16 provided on the inner shell 2 or on the insulating shells 10, respectively, and the opposite ends penetrate through openings 17 of the insulating shells 10 or through an opening 18, respectively, of an insert 19 provided in the outer shell 1 likewise with flexible tongues, wherein collar-shaped shoulders 20 are provided for positional fixation so that the bolts 11 can also absorb compressive forces.

The positioning elements 11 are arranged so as to be evenly distributed around the longitudinal axis 6 of the cryocontainer, wherein, according to the exemplary embodiment illustrated in FIG. 1 (cf. in particular FIG. 3), three positioning elements 11 are provided for each plane of attachment so that the angular distance between adjacent positioning elements 11 around the longitudinal axis 6 amounts to 120°.

The two parts 10' and 10" of the insulating shells are connected by a simple plug connection 21 so that safeguarding of the position of the two parts 10', 10" plugged into each other transversely to the longitudinal axis 6 of the cryocontainer is provided.

According to the exemplary embodiment illustrated in FIGS. 4 to 6, the positioning elements are likewise formed from bolts 11 which, on the one hand, are provided with an eye 21 on an insert 16 attached to the inner shell 2 or an insulating shell 10, respectively, whereas, on the other hand, the other end of each bolt 11 is provided with an internal thread 23 into which a screw 24 penetrating through the insulating shells 10 at an opening 17 is screwed. By means of said screw, it is possible to adjust tensile forces in the bolts 11 between the two support points of each bolt 11 so that two parts 10' and 10" of an insulating shell 10 are in each case pressed against each other.

According to the embodiment according to FIGS. 7 and 8, the bolts 11 are in each case fastened at one end to the insulating shells 10 with a self-locking sealing ring 25, with the sealing ring 25 being slid thereon so far that the bolts 11 will be subject to tensile stress.

FIG. 9 shows an embodiment in which the positioning elements are not formed from bolts 11, but by magnets 26, so that the forces pressing the parts 10', 10" of an insulating shell 10 against each other are produced by magnetic forces.

FIG. 10 shows an embodiment in which the positioning elements 27 are designed as spring elements, namely as helical spring elements 27, whose central axes 28 are oriented similarly to the axes of the bolts 11 illustrated in FIG. 1. According to FIG. 10, the insulating shell 10 is supported on the outer shell 1, for which reason the spring elements 27 are designed as compression springs so that forces pressing the two parts 10' and 10" of the insulating shell 10 against each other are caused by them. If the insulating shell 10 is fastened to the inner shell 2, those spring elements 27 are designed as tension springs. Of course, those spring elements 27 may also be provided in local dents or bulges 14, respectively, in analogy to FIG. 1. If said bulges 14 have a sufficient size, the longitudinal axes 28 of the spring elements 27 can also be oriented normally to the surface of the insulating shell 10.

FIG. 11 shows a connection of two parts 10' and 10" of an insulating shell 10, which is accomplished by a weld seam 29. An adhesive joint might also be provided. According to FIG. 12, a hook connection 30 for securing the parts 10' and 10" of an insulating shell 10 relative to each other is illustrated, which hook connection is shown in section in FIG. 12 and in elevation in FIG. 13.

In FIG. 14, it is noticeable that the individual parts 10' and 10" of the insulating shells have elevations 31 extending across a portion of the circumference, which are arranged so as to be offset from each other with regard to the circumference. For example, the elevation 31 of the outermost bottom part 10' of an outermost insulating shell 10 is shifted to the left relative to the elevation 31 of the next part 10' of the adjacent insulating shell 10 etc. The elevation 31 of the innermost part 10' of the lower insulating shell is shifted farthest to the right. Thus, at least one segment of each elevation 31 is always uncovered.

In this manner, it is possible to grasp the individual insulating shells 10 using tools specifically designed therefor and place them in a correct position relative to each other in order to establish the connection between the top parts and the corresponding bottom parts 10' and 10" and to facilitate the assembling process. The outwardly projecting edges 32 also provide working surfaces for the tools.

It is also possible to provide other means instead of the elevations 31, for example, pegs and bushes or grooves and springs entering into an operative connection with each other.

As can be seen from FIG. 15, in an embodiment similar to that illustrated in FIG. 5, disk springs 33 are provided between the heads of the screws 24 and the bulges 14, which disk springs allow an initial tension to be adjusted during the installation of an insulating shell 10, i.e., between the two halves 10' and 10" thereof. Furthermore, the disk springs 33 enable the absorption of thermal expansions which occur in operation because of the cooling and heating of different layers.

According to FIG. 16, the use of helical springs 27 as positioning elements is illustrated in detail, wherein the individual helical springs 27 of the plurality of insulating shells 10 are provided in alignment with each other. The insulating shells 10 exhibit access openings 34 centrically to the axes 28 of the helical springs 27. Each of the helical springs 27 rests with one end against the bulge 14 of an insulating shell 10 via a spring washer 35 (cf. FIG. 17) which is provided with a gripping part 36. Said part allows the helical springs 27 to be compressed during the assembly of the insulating shells 10 by means of a hook insertable from the outside, i.e., through the access openings 34, so that the next insulating shell 10 can be installed, whereupon the compressed helical spring 27 is released by retracting the hook and the helical spring 27 can assume the position depicted in FIG. 16. The outer shell 1 also has an access opening which is closable by a lid 37.

FIG. 18 shows a section taken along line XVIII-XVIII of FIG. 19, and FIG. 19 shows a section taken along line XIX-XIX of FIG. 18.

In FIGS. 18 and 19, a container for receiving a magnetizing coil 38 is shown, with the magnetizing coil being arranged in an inner shell 2 filled with helium. Said inner shell 2 is connected to the outer shell 1 in a positionally stable manner via fastening elements 3. An insulating shell 10 is provided between the inner shell 2 and the outer shell 1, which insulating shell is attached to the outer shell 1 via positioning elements designed as spring elements 27. Both the inner shell 2 and the outer shell 1 and also the insulating shell 10 are designed as toroidal bodies.

In FIGS. 20 and 21, a variant is illustrated in analogy to FIGS. 18 and 19, wherein a magnetizing coil 38 is surrounded by an insulating shell 10 in the dry state, i.e., without a helium vessel, which insulating shell 10 is provided within an outer shell 1. In this case, the magnetizing coil 38 itself is attached to the outer shell 1 via fastening elements 3, the insulating shell 10 in turn being positionally secured to the outer shell 1 via positioning elements designed as spring elements 27.

Of course, any type of devices to be cooled or to be kept cool can be provided in a container according to the invention, wherein, suitably, the device itself is then attached to the outer shell via fastening elements so that no inner shell is required in that case, unless the device itself has to be surrounded by a cryogenic liquid, in which case the device is provided in an inner shell, wherein the inner shell is then arranged on the outer shell in a positionally stable manner via fastening elements.

Thus, the container according to the invention is suitable for storing superconductors, structural units of cooling systems, for storing sensitive electronic switching circuits, for cryopumps, for random material samples such as organic substances, e.g., sperm, ovocytes etc. to be stored at low temperatures.

The invention is not limited to the exemplary embodiments defined in the figures, but can be modified in various respects. As has already been indicated, it is possible, for example, to provide any number of insulating shells 10 in order to meet the various demands on the temperature insulation.

The insulating shells can also be composed of several parts, wherein portions can be slid on also along other axes than the main sliding axes of the end pieces (bumped boiler ends or parts of the insulating shells where the positioning elements are attached) of the insulating shells. Those parts are either plugged together, welded together or secured via hooks, or they are secured relative to each other by plug connections via the forces securing the two end parts relative to each other.

A person skilled in the art has free choice regarding the number of positioning elements. For example, it may be required to arrange more than three positioning elements 11 for each plane of attachment, if specific demands are made on stability, e.g., for using a cryotank in heavy construction equipment. For stabilizing an insulating shell 10, it may be advantageous to arrange at least one positioning element 11 in a way which is not radially symmetrical, with the viewing direction toward the longitudinal axis 6. Yoke elements or loops stuck to the insulating shell or to the inner shell and/or outer shell, respectively, or formed integrally therewith may also be used as positioning elements. It is essential that no direct contact between the shells occurs such as according to AT 502 191 B1.

In FIG. 22, a detail of the upper part of a first embodiment of a variant of a cryocontainer 41 according to the invention is illustrated in perspective view. The cryocontainer 41 comprises an outer container 42 and an inner tank 43, with the inner tank 43 being arranged inside the outer container 42. As can be seen in FIG. 22, the inner tank 43 is positioned in the outer container 42 coaxially with regard to the longitudinal axis 44 of the cryocontainer 41 and centrally with regard to a common central point. A non-coxial and/or decentralized orientation of the inner tank 43 in the outer container 42 is also possible and advantageous for some applications.

Both the outer container 42 and the inner tank 43 have an essentially cylindrical basic shape, with the edges of the top and bottom surfaces, where the lateral surface merges into the top and bottom surfaces, having a rounded design. Furthermore, a spherical design of the cryocontainer or a configuration in the shape of an ellipsoid are, for example, possible.

The inner tank 43 is suspended or kept, respectively, in the outer container 42 in a positionally stable manner at its upper end via first fastening elements 45a and at its lower end via second fastening elements 45b, preferably of the same design. The first and second fastening elements or inner tank suspensions 45a, 45b, respectively, are torsionally rigid loops, however, rigid cross-struts may also be used. The fastening elements 45a, 45b may also be designed as coaxial pipes slidable or insertable into each other. The fastening elements 45a, 45b are made of carbon-fibre reinforced plastic CFK.

At least three first fastening elements 45a and at least three second fastening elements 45b are in each case provided on the opposite sides of the cryocontainer 41. They are arranged regularly with regard to the circumference, i.e., with an angular distance of 120°.

An upper first suspension bracket 52a is arranged at the poles of the cryocontainer 41 and a lower second suspension bracket 52b is arranged at the lower end, and they are firmly connected to the outer container 42. The upper first suspension bracket 52a and the lower second suspension bracket 52b are firmly connected to the outer container only as one of the final steps of the assembly. First and second suspension bolts 53a and 53b are formed on those first and second suspension brackets 52a, 52b, which suspension bolts extend inwards toward the inner tank 43. The first and second suspension bolts 53a and 53b are designed so as to be twistable in order to allow later fixing of the fastening elements 45a, 45b. In addition, space is thereby saved.

Three inner tank bolts 51a, 51b are, in each case, formed on the surface of the inner tank 43, namely in the region of the transition of the lateral surface to the top surface and bottom surface, respectively, with the inner tank bolts protruding from the surface of the inner tank 43. Those first and second inner tank bolts 51*a*, 51*b* are arranged in cavities 67 and disappear completely in those cavities. In this manner, the fastening elements 45*a*, 45*b* are prevented from sliding off the inner tank bolts 51*a*, 51*b* through the innermost insulating shell 47', if said shell is located in its final position.

The fastening elements 45*a*, 45*b* extend between the first and second inner tank bolts 51*a*, 51*b*, respectively, and the first and second suspension bolts 53*a*, 53*b*, respectively. In this way, a positionally stable suspension of the inner tank 43 in the outer container 42 is ensured.

An evacuatable clearance 46 is thus formed between the outer container 42 and the inner tank 43. In the embodiment according to FIG. 22, six individual insulating shells 47', 47", 47''' etc. are arranged in said clearance 46. The insulating shells 47 are designed as radiation shields, serve for better heat insulation and consist of a material having favourable properties with regard to heat transmission through radiation, for example, aluminium or copper. Metal-coated synthetic films, for example, films coated with aluminium, copper or gold etc. in a thickness of between 100 and 500 Å, are usable as well.

The insulating shells 47 surround the inner tank 43 in the shape of an onionskin and run largely parallel to each other. The distance between the individual insulating shells 47 is approximately 1 to 10 mm in the area of the lateral surface and in the area of the poles of the cryocontainer 41 and should be kept as small as possible. The individual insulating shells 47 do not contact each other and are not adjacent to each other. Rather, they are completely spaced apart from each other and are interconnected merely via suspension belts 48*a*, 48*b*, which will be described later on.

A detailed view of the top side of the cryocontainer 41 is illustrated in FIG. 23. A first suspension bolt 53*a* is identifiable, starting from which a first fastening element 45*a* extends downwards toward a first inner tank bolt 51*a*. Six insulation shells of varying sizes, which run in the area of the upper pole of the cryocontainer 41, are also clearly identifiable, with the innermost insulation shell 47' being closest to the inner tank 43 and the outermost insulation shell 47''''' being closest to the outer container 42.

The fastening elements 45*a*, 45*b* are oriented radially and, respectively, intersect in their virtual extension in the longitudinal axis 44 of the cryocontainer 41.

The cryocontainer 41 and the outer container 42, respectively, exhibit a certain number of bulges 49 formed on the top side and on the bottom side. Those bulges 49 lie in the area of the inner tank bolt 51 and of the suspension bolts 53 and extend radially outwards. Suspension belts 48*a*, 48*b*, which will be described later on, and also fastening elements 45*a*, 45*b* are arranged within those bulges 49, whereby the individual insulating shells 47 are connected to each other and, respectively, to the outer container 42 or the inner tank 43 in the area of those bulges 49. Each individual insulating shell and also the outer container 42 exhibit such bulges 49, wherein the bulges 49 in the outer container 42 are correspondingly designed so as to be largest, and the bulges 49 of the individual insulating shells 47 become increasingly smaller toward the inside.

The bulges 49 serve, on the one hand, for accommodating the fasteners in the form of suspension belts 48*a*, 48*b*, which will be described later on, which fasteners are to be designed as long as possible. Moreover, the bulges serve for improving the structural integrity as well as the stability and stiffness, respectively, of the insulating shells 47 and of the outer container 42.

In FIG. 24, such a bulge 49 is illustrated in detailed view. A first fastening element 45*a* is identifiable, which is spanned to the first inner tank bolt 51*a*, starting from the suspension bolt 53*a*. The fastening element 45*a* is designed in the shape of a loop which can be placed over the bolts 51*a*, 53*a*.

The fastening elements 45*a*, 45*b* run through notches 68 formed in each insulating shell 47. For reasons of insulation, the notches 68 are advantageously dimensioned as small as possible. The notches 68 of the individual insulating shells 47 lie in a straight line relative to each other and are arranged in alignment. The notches 68 can be formed in different sizes between the top side and the bottom side of the cryocontainer 41, depending on the assembling method of the cryocontainer 41. For example, the notches 68 for the implementation of the second fastening elements 45*b*, which are mounted later in the process, are larger than the notches 68 for the implementation of the first fastening elements 45*a*, which are mounted first.

A section through a bulge 49 is illustrated in FIG. 24, wherein the wall of the outer container 42 which lies on top is identifiable as well as the individual insulating shells 47''''' to 47' arranged underneath and running essentially parallel to each other. The fasteners are depicted in the rear region of the bulge 49 in FIG. 24 and will be addressed in detail further below.

As has already been indicated, the individual insulating shells 47 are attached either to the inside of the outer container 42 or, in an alternative embodiment, to the outside of the inner tank 43. The attachment of the insulating shells 47 is effected via suspension belts or bands 48*a*, 48*b*, respectively, which are provided in the boundary or transition region, respectively, of the top side and the bottom side toward the lateral surface. Thus, at least 3 first and second suspension belts 48*a*, 48*b*, which are basically spaced apart uniformly, are provided on each side. Said suspension belts or bands 48*a*, 48*b* are made of a flexible pliable material of high tensile strength and low thermal conductivity, preferably of carbon fibres without matrix.

FIG. 25 shows a detailed view of a section through a bulge 49, e.g., of FIG. 24, in a first embodiment of a cryocontainer 41. It can be seen that a first suspension belt 48*a* is placed in a serpentine or meandering manner, respectively, between the outer container 42 and the innermost insulating shell 47'. Each insulating shell 47 exhibits a front recess 70, a middle recess 71 and a rear recess 72 which are arranged in line and through which the suspension belt 48*a* is guided. The suspension belt 48*a* is fixed via clamping devices 61, 63. The deflection is effected via rounded deflection elements 60 or rounded edges of the clamping devices 61, respectively.

The suspension belts 48*a*, 48*b* are advantageously designed as long as possible, resulting in low heat dissipation.

As can be seen in FIG. 25, the first suspension belt 48*a* is securely connected to the outer container 42 via an outer fastening device 65. The first suspension belt 48*a* extends from said outer fastening device 65 toward the front recess 70''''' and is guided therethrough. Via the deflection element 60''''', the suspension belt 48*a* is deflected by slightly more than 180°. The deflection element 60''''' is designed as a pipe section element having an axial longitudinal cut. Via said longitudinal cut, it is pushed or placed, respectively, onto the outermost insulating shell 47''''', starting from the front recess 70'''''. The side of the pipe section element opposite to the longitudinal slot extends through the front recess 70'''''. Furthermore, the suspension belt runs through the middle recess 71''''' and back to the outer side of the outermost insulating shell 47''''', which outer side faces the outer container 42. In the area behind the middle recess 71''''', a clamping device 61''''', 63''''' is arranged on the outermost insulating shell 47'''''. Said clamping device consists of an essentially oblong rectangular lamina 61'''' as well as a clamp strap 63''''. The suspension belt 48a is secured between the lamina 61'''' and the clamp strap 63'''' and is thus fastened fixedly to the outermost insulating shell 47''''. Furthermore, the suspension belt 48a extends through the rear recess 72'''' towards the next inner insulating shell 47'''' and is deflected about a rounded edge of the oblong clamping element 61'''' by approximately 160 to 170°. Subsequently, the suspension belt 48a runs toward the front recess 70'''' and the deflection element 60'''', respectively, of the next inner insulating shell 47''''. In this way, the path of the suspension belt 48a continues through all insulating shells 47'''' to 47' towards the inner tank 43.

The suspension belts 48a, 48b are placed in a meander shape such that a force component compressing the insulating shells 47 will result. The direction of the suspension belts or bands 48a, 48b produces a force component which compresses the oppositely located corresponding insulating shells 47a, 47b, whereby lifting of the insulating shells is permitted if the suspension belts or bands 48a, 48b are attached to the outer container 42.

A further embodiment of an alternative cryocontainer 41 is shown in FIGS. 26 and 27. In contrast to the embodiment according to FIG. 22, in said embodiment, the insulating shells 47 are not attached to the outer container 42, but only to the inner tank 43.

In FIG. 26, a detail of an upper portion of a cryocontainer 41 is shown, which shows a section through a bulge 49. A suspension bolt 53a is identifiable, starting from which a first fastening element 45a extends toward an inner tank bolt 51a. The inner tank bolt 51a lies in a cavity 67. The illustrated cryocontainer 41 also comprises six insulating shells 47a' to 47a''''. The wall of the outer container 42 is arranged completely on the outside.

In FIG. 27, an enlarged illustration of the fasteners of the individual insulating shells 47 is visible. The first suspension belt 48a is securely attached to the inner tank 43 with an inner fastening device 66. The inner fastening device 66 also lies inside the cavity 67 in a radial extension toward the inner tank bolt 51a. Starting from said inner fastening device 66, the suspension belt 48a extends to the rear recess 72' of the innermost insulating shell 47'. The suspension belt 48a is passed through said rear recess 72' and deflected by approximately 160 to 170°. A clamping device 61', 63' is provided directly behind said rear recess 72', with the suspension belt 48a being deflected about a rounded end edge of the clamping lamina 61'. In said clamping device 61', 63', the suspension belt 48a is firmly connected to the innermost insulating shell 47' and fixed thereto. Furthermore, the suspension belt 48a runs through the middle recess 71' back to the inner side of the innermost insulating shell 47', which inner side faces the inner tank 43. Subsequently, it runs around the deflection element 60', which is attached to the innermost insulating shell 47', and is thereby deflected by approximately 180° and passed through the front recess 70'. Furthermore, the suspension belt 48a runs toward the rear recess 72'' of the next outer insulating shell 47''. In this way, the suspension belt 48a winds in the shape of a meander from the inside to the outside through all insulating shells 47 and fixes them relative to each other in their respective positions and to the inner tank 43. The suspension belt 48a is finally fixed to the clamping device 61'''', 63'''' of the outermost insulating shell 47'''' and ends there. There is no connection to the outer container 42.

As is visible in the previous figures, neither a mechanical connection, nor an operative connection of a different kind exists between the fastening elements 45a, 45b and the suspension belts 48a, 48b. The two elements are elements independent of each other and mechanically separated from each other.

In FIGS. 31 and 32, it is illustrated that the cryocontainer 41 and/or the outer container 42 and/or the insulating shells 47 are composed of at least two single elements which can be fit together. In FIG. 32, the lower partial shells 47b are illustrated, for example. Such a cryocontainer 41 is composed of upper partial and/or half shells 47a and lower partial and/or half shells 47b, with the outer container 42 also comprising an upper half 42a and a lower half 42b. During assembly, those single elements and/or partial shells 47a, 47b are connected to each other and/or optionally stuck together, for example, via plug or snap-in connections 80.

In FIGS. 31 and 32, the structure of the individual partial shells 47a, 47b is illustrated in detail. In FIG. 32, a plug or snap-in connection 80 is illustrated in detail. Two upper first partial shells 47a' and 47a'' have already been connected to two lower second partial shells 47b', 47b'', the further second lower partial shells 47b''' to 47b'''' are still unconnected or free, respectively.

Each second or lower partial shell 47b, respectively, comprises several essentially rectangular lower second positioning means in the form of elevations 81b, which positioning means are distributed regularly along the circumference thereof and are adapted to the curvature of the second partial shell 47b. Those elevations 81b exhibit, in each case, a lower edge 82b projecting obliquely upwards in an outward direction. Each first and/or upper partial shell 47a also comprises several essentially rectangular upper first positioning means in the form of elevations 81a, which positioning means are distributed regularly along the circumference and, with regard to their dimensions and their distribution and their positioning relative to each other, correspond to the lower elevations 81b and/or are associated therewith, respectively. The upper elevations 81a likewise exhibit, in each case, an edge 82a projecting obliquely downwards in an outward direction.

As can be seen in FIG. 31, the elevations 81a, 81b are located opposite to each other during installation. The assembly and/or the connection of the two partial shells 47a, 47b is effected by pushing the upper partial shell 47a into the lower partial shell 47b. The outwardly projecting lower edges 82b thereby enable the insertion process required for the connection.

Furthermore, the lower partial shells 47b have a continuous locking rail 83 running around the periphery in parallel and spaced apart from the end edge, which locking rail engages the outwardly projecting edge 82a of the corresponding upper partial shell 47a and is kept therein non-positively with regard to traction and pressure.

In FIG. 31 and FIG. 32, it can be seen that the individual partial shells 47a, 47b and/or the elevations 81a, 81b of the individual partial shells 47a, 47b are arranged so as to be offset from each other with regard to the circumference. For example, the elevation 81b'''' of the outermost lower partial shell 47b'''' is shifted to the left relative to the elevation 81b'''' of the next partial shell 47b'''' etc. The elevation 81b' of the innermost lower partial shell 47b' is shifted farthest to the right. In this way, at least one segment of each elevation 81 is always uncovered.

In this manner, it is possible to grasp the individual insulating shells 47a, 47b using tools specifically designed therefor and place them in a correct position relative to each other in order to establish the connection between the upper and the corresponding lower partial shells and to facilitate the insertion process. The outwardly projecting edges 82*a*, 82*b* also provide working surfaces for the tools.

It is also possible to design the positioning means 81 differently, for example, as pegs and bushes or grooves and springs entering into an operative connection with each other.

In addition, passages (not illustrated) to the inner tank 43 for conduits are provided in the partial shells 47*a*, 47*b* and in the outer container 42. They can be arranged, for example, along or parallel to the longitudinal axis 44.

According to FIGS. 33 and 34, an insulating shell exhibits a recess 100 which allows the parts 47*a*' and 47*b*' of the insulating shell to be slid over the suspension bracket 52*a* or 52*b*, respectively, attached to the inner shell 43 via fastening elements 45*a* or 45*b*, respectively, which suspension bracket ensures positionally stable attachment of the inner shell 43 to the outer shell 42.

Said recess 100 is closed by a lid 58*b*' after the insulating shell has been slid on.

Below, the construction and a process for assembling the first embodiment of the cryocontainer 41, as illustrated in FIG. 22, are described, wherein the three insulating shells 47', 47" and 47''' are attached to the outer container 42:

The process comprises the following steps, wherein the individual steps may also be performed simultaneously or in a slightly changed order:

a) Attaching a first outer container part 42*a* using a first outermost positioning ring 55*a* in such a position that the opening of the first outer container part 42*a* will point downwards (FIG. 29), b) Hooking in the three first suspension belts 48*a* on the inside of the first outer container part 42*a* at the points provided therefor, namely the outer fastening devices 65 (FIG. 29), c) Prepositioning the first outermost partial shell 47*a*''' using a first further positioning ring 55*a*''' in front of, but still outside of the opening of the first outer container part 42*a* in such a way that the opening of the first outermost partial shell 47*a*''' will point into the same direction as the opening of the first outer container part 42*a* (FIG. 29), d) Threading the first suspension belts 48*a* through the recesses 70, 71, 72 and, respectively, around the clamping devices 61, 63 and the deflection element 60 of the first partial shell 47*a*''', respectively (FIG. 29).

e) Inserting the first outermost partial shell 47*a*''' into the first outer container part 42*a* and fixing it therein using the respective positioning rings 55*a*''' and 55*a* (FIG. 30). The positioning rings 55 are interconnected with a releasable connection.

f) Threading the three first upper fastening elements 45*a* through the slots or notches 68, respectively, in the first outermost partial shell 47*a*''' (FIG. 30). For the time being, they hang loosely there. Steps d), e) and f) are performed simultaneously or in random order.

g) Applying an initial tension to the first suspension belts 48*a* (FIG. 30), h) Fixing the first suspension belts 48*a* with the first clamping devices 61, 63 (FIG. 30). The suspension belts 48*a* thereby produce a force which presses the first outermost partial shell 47*a*''' downwards out of the first outer container part 42*a*. Said force is absorbed by the positioning rings and, respectively, by the lock between the two positioning rings.

i) Inserting two further first partial shells 47*a*", 47*a*', . . . by analogously repeating steps c) to h), j) Shortening the first suspension belts 48*a* after installation of the innermost partial shell 47*a*'. One half of the cryocontainer 41 has thus been completed. The arrangement is maintained by the positioning rings 55.

k) Inserting the inner tank 43 by introducing it into the opening of the innermost first partial shell 47*a*', l) Putting the first fastening elements 45*a* around first inner tank bolts 51*a* of the inner tank 43 as soon as the inner tank 43 is close enough. This is possible because of the length of the loops 45*a* which is still sufficient, since they are not yet placed around the suspension bolts 53*a*. Steps k) and l) may be performed simultaneously or in random order.

m) Mounting a first suspension bracket 52*a* to the outside of the first outer container part 42*a*, n) Attaching the first fastening elements 45*a* to first suspension bolts 53*a* of the first suspension bracket 52*a* and fixing them by twisting the first suspension bolts 53*a*. The inner tank 43 thus hangs from the first suspension bracket 52*a*.

o) Assembling the second part of the jacket of the inner tank 43 by analogously repeating assembly steps a) to j) for the three second partial shells 47*b*', 47*b*", 47*b*''' and the second outer container part 42*b*, respectively. The result is an arrangement comprising the second outer container part 42*b* and the three second partial shells 47*b*', 47*b*", 47*b*''' connected to each other and to the second outer container part 42*b*.

p) Removing all second positioning rings 55*b* of the second part of the jacket and sliding the second part of the jacket with the innermost second partial shell 47*b*' from below over the end of the inner tank 43 which is still free from partial shells. After its assembly, said second jacket arrangement is turned upside down in order to be able to slide it from below over the inner tank 43.

q) Removing the innermost first positioning ring 55*a*' of the innermost first partial shell 47*a*', whereby said shell sinks down and rests on the side of the inner tank 43 which is close to the first suspension bracket 52*a*, r) Lifting the innermost second partial shell 47*b*' and connecting the innermost first partial shell 47*a*' to the innermost second partial shell 47*b*' by a snap-in or plug connection 80. Said plug connection must be dimensioned so as to be strong enough for carrying the weight of the lower innermost second partial shell 47*b*' during the assembling process. The lower innermost second partial shell 47*b*' can be lifted because the suspension belts 48*b* are designed in a flexible manner.

s) Attaching the second fastening elements 45*b* to the second inner tank bolt 51*b* of the inner tank 43 during lifting. The fastening elements 45*a*, 45*b* are prevented from sliding off by the innermost partial shell 47*a*' and 47*b*', as soon as said shell is in the final position. Steps r) and s) may be performed simultaneously or in random order.

t) Mounting the two further partial shells 47*b*", 47*b*''' by analogously repeating steps q) to r). After removal of the positioning ring 55*a*", the first partial shell 47*a*" sinks down until the suspension belts 48*a* are stretched.

u) Mounting the second outer container part 42*b* and welding the first outer container part 42*a* to the second outer container part 42*b*.

v) Placing a second suspension bracket 52*b* on the outside of the second outer container part 42*b* in a position opposite to the first suspension bracket 52*a*.

w) Putting the second fastening elements 45*b* onto the second suspension bolt 53*b* and optionally fixing them by twisting the second suspension bolts 53*b*.

x) Adjusting the desired initial tension in the fastening elements 45 by pulling at the suspension brackets 52.

y) Welding the two suspension brackets 52 to the outer container 42.

z) Attaching a lid for covering the suspension brackets 52 in a vacuum-tight manner.

Alternatively, the suspension brackets 52 can be supported via one shaft nut 110 each. In that case, the step of adjusting the initial tension and welding can take place simultaneously.

FIG. 35 illustrates the possibility of lifting a partial shell relative to an adjacent partial shell and, respectively, relative to the inner tank or the outer container, whereby the installation, i.e., the assembly of two partial shells, is feasible in a substantially simplified manner because of better accessibility. Angle designates the relative position of two corresponding points of two adjacent partial shells in respect of a horizontal line extending through the point of the outer partial shell at the time of assembling the two partial shells. Angle $\phi_{final\ position}$ designates the relative position of the two corresponding points of two adjacent partial shells in respect of a horizontal line extending through the point of the outer partial shell at the time of finishing assembly, i.e., when the inner partial shell has been lifted to its maximum.

The invention claimed is:

1. A container for receiving cryogenic media to be stored at low temperatures, the container comprising:
   an outer shell;
   an inner shell connected to the outer shell in a positionally stable manner via fastening elements; and
   at least one insulating shell disposed between the outer shell and the inner shell, the at least one insulating shell being connected to one of the outer shell and the inner shell in a positionally stable manner, the connection of the at least one insulating shell being provided via positioning elements that are independent of the fastening elements, the at least one insulating shell being formed having at least a two-piece design, and the at least one insulating shell being arranged in a contactless manner from the inner shell, outer shell, and, if any, adjacent insulating shells.

2. The container according to claim 1, wherein at least some of the positioning elements are formed from bolts.

3. The container according to claim 1, wherein each of said bolts are supported or anchored on the inner shell, outer shell, or the at least one insulating shell by a collar provided on one of the ends thereof and by a self-locking sealing ring slid onto the other end thereof.

4. The container according to claim 2, wherein each of said bolts are equipped with snap-in lugs provided at their ends which serve for being inserted into openings on the inner shell, outer shell, or the at least one insulating shell for anchoring the bolts in said openings.

5. The container according to claim 2, wherein each of said bolts are anchored with one end on the inner shell, outer shell, or the at least one insulating shell by means of a screw connection.

6. The container according to claim 1, wherein at least some of the positioning elements are spring elements.

7. The container according to claim 6, wherein the positioning elements are helical spring elements.

8. The container according to claim 1, wherein at least some of the positioning elements clamp the at least one insulating shell against the inner shell or against the outer shell and are supported or anchored on the at least one insulating shell and on the inner shell or outer shell, respectively.

9. The container according to claim 1, wherein the at least one insulating shell includes a first insulating shell and a second insulating shell, and said positioning elements are supported or anchored on the first insulating shell and the second insulating shell adjacent to the first insulating shell.

10. The container according to claim 1, wherein, at the locations where said positioning elements are provided, the at least one insulating shell or the outer shell has bulges extending alongside the positioning elements for locally receiving the corresponding positioning elements and some of the positioning elements are supported or anchored in end regions of the bulges.

11. The container according to claim 1, wherein a longitudinal axis of each of the positioning elements is inclined toward the surface of the inner shell, outer shell, or the at least one insulating shell in the area of the attachment of the positioning elements.

12. The container according to claim 1, wherein at least some of the positioning elements are formed from magnets.

13. The container according to claim 1, wherein the positioning elements are arranged with regard to a longitudinal axis of the container so as to be evenly distributed around the longitudinal axis of the container.

14. The container according to claim 13, wherein the position elements include at least three positioning elements arranged and distributed around the longitudinal axis of the container.

15. The container according to claim 1, wherein each of the at least one insulating shell is formed from two half shells, and each half shell is connectable to the other by a plug connection.

16. The container according to claim 15, wherein each half shell is directly or indirectly attached to the outer shell, the inner shell, or, if any, adjacent insulating shell via the positioning elements.

17. The container according to claim 1, wherein the at least one insulating shell includes a first part and a second part and the position elements force securing the first and second parts relative to each other.

18. The container according to claim 1, wherein the at least one insulating shell includes a first part and a second part and the first and second parts are positionally secured relative to each other by hooks.

19. The container according to claim 1, wherein the at least one insulating shell includes a first part and a second part and the first and second parts are connected to each other by an adhesive or welded joint.

20. The container according to claim 1, wherein the at least one insulating shell includes a plurality of insulating shells, and
   wherein the positioning elements are helical springs, the helical springs being arranged in alignment with each other for supporting adjacent insulating shells of the plurality of insulating shells, and each of the plurality of insulating shells including access openings for the helical springs.

21. The container according to claim 1, wherein a magnetizing coil is connected to the outer shell in a positionally stable manner via the fastening elements.

22. The container according to claim 1, wherein the outer shell defines an outer container, the inner shell defines an inner tank, and the at least one insulating shell includes a plurality of insulating shells connected to each other and to at least one of the inner tank and the outer container via suspension belts or bands, the suspension belts or bands being flexible or pliable.

23. The container according to claim 22, wherein first suspension belts or bands, are arranged in an area of the top side or of an upper pole region, respectively, of the inner tank and of the outer container, and second suspension belts or bands are arranged in an area of the opposite bottom side or of a lower pole region, respectively, of the inner tank and of the outer container, and
wherein the first and second suspension belts or bands are connected to the outer container, the plurality of insulating shells, and the inner tank.

24. The container according to claim 23, wherein at least three first and second suspension belts are uniformly arranged.

25. The container according to claim 23, wherein the first and second suspension belts or bands are directly attached to the inside of the outer container via outer fastening devices and each of the insulating shells is fixed in a positionally firm manner with regard to the outer container and the other insulating shells, with the inner tank being supported by the first and second suspension belts or bands in a contactless manner.

26. The container according to claim 23, wherein the first and second suspension belts or bands are directly attached to the outside of the inner tank via inner fastening devices and each insulating shell is fixed in a positionally firm manner with regard to the inner tank and the other insulating shells, with the outer container being supported by the suspension belts or bands in a contactless manner.

27. The container according to claim 26, wherein the inner fastening devices are arranged in cavities.

28. The container according to claim 23, wherein each insulating shell has recesses through which the first and second suspension belts or bands respectively, run.

29. The container according to claim 23, wherein each of the insulating shells includes two corresponding partial shells, and
wherein the first and second suspension belts or bands run in the shape of a meander from one insulating shell to an adjacent insulating shell between the recesses of the insulating shells and that the first and second suspension belts or bands produce force components which compress oppositely located corresponding partial shells, whereby lifting of the partial shells is permitted by the first and second suspension belts or bands being attached to the outer container.

30. The container according to claim 22, wherein the suspension belts are fixed to the respective insulating shells via clamping devices.

31. The container according to claim 22, wherein rounded deflection elements are provided on each insulating shell, which deflection elements are arranged in front recesses of each insulating shell.

32. The container according to claim 22, wherein each suspension belt extends toward a front recess of an outermost insulating shell of the plurality of insulating shells, starting from an outer fastening device of the outer container, is passed through said front recess and is deflected by approximately 180° via a deflection element of the outermost insulating shell, is furthermore passed through a middle recess and back to the outer side of the outermost insulating shell and is secured in a clamping device, is furthermore passed through a rear recess of the outermost insulating shell and is deflected by approximately 180° and is guided toward the front recess of a deflection element of an adjacent inner insulating shell of the plurality of insulation shells, and said path continues inwards through all insulating shells until the suspension belt ends on a clamping device of the innermost insulating shell of the plurality of insulating shells.

33. The container according to claim 22, wherein each suspension belt extends toward a rear recess of an innermost insulating shell of the plurality of insulating, starting from an inner fastening device of the inner tank, is passed through said rear recess and deflected by approximately 180°, is secured in a clamping device of the innermost insulating shell, is furthermore passed through a middle recess and back to the inner side of the innermost insulating shell, is furthermore passed through a front recess and is deflected by approximately 180° via a deflection element of the innermost insulating shell and is guided toward the rear recess of an adjacent outer insulating shell of the plurality of insulating shells and said path continues outwards through all insulating shells until the suspension belt ends on the clamping device of the outermost insulating shell of the plurality of insulating shells.

34. The container according to claim 22, wherein the suspension belts, fastening elements, deflection elements and/or the clamping devices are arranged in bulges formed from the surface of the outer container and of the insulating shells and/or form those bulges.

35. The container according to claim 22, wherein the outer container is formed having at least a two-piece design.

36. The container according to claim 22, wherein each piece of each insulating shell is connectable via plug, adhesive and/or snap-in connections to form the corresponding insulating shell.

37. The container according to claim 22, wherein each insulating shell includes a first partial shell and a second partial shell,
wherein on each first partial shell and on each second partial shell, several positioning means distributed along the rim or circumference thereof are formed,
wherein the positioning means of the first partial shells are operatively connectable to the positioning means of the second partial shells via a pressurized and/or tensile connection,
wherein the positioning means of the first partial shells are arranged so as to be offset from each other with regard to the circumference of the first partial shells or partially overlap each other in an offset manner, and
wherein the positioning means of the second partial shells are arranged so as to be offset from each other with regard to the circumference of the second partial shells or partially overlap each other in an offset manner with segments or zones, the positioning means protruding or being uncovered in such a way that they are admittable as working surfaces for appropriate installation tools.

38. The container according to claim 37, wherein the positioning means are rectangular elevations adapted to the curvature of the corresponding partial shells, each elevation has one edge projecting outwards in an oblique manner, and
wherein the second partial shells and the corresponding first partial shells are insertable into each other or connectable to each other in such a way that the edges of the second partial shells non-positively engage a locking rail formed in each first partial shell or the edges of the first partial shells non-positively engage a locking rail formed in each second partial shell.

39. The container according to claim 37, wherein the positioning means are rectangular elevations adapted to the curvature of the corresponding partial shells or interlocking pegs and bushes.

40. The container according to claim 37, wherein the positioning means of the first partial shells are operatively connectable to the positioning means of the second partial shells via a snap-in and/or adhesive connection.

41. The container according to claim 22, wherein each insulating shell includes a first partial shell and a second partial shell, and wherein recesses closable by one-piece or multi-piece lids are formed in the first and second partial shells.

42. The container according to claim 22, wherein a clearance between the outer container and the inner tank is free from superinsulating layers.

43. A container for receiving cryogenic media to be stored at low temperatures, the container comprising:
- an outer shell;
- a device connected to the outer shell in a positionally stable manner via fastening elements; and
- at least one insulating shell disposed between the outer shell and the device, the at least one insulating shell being connected to one of the outer shell and the device in a positionally stable manner, the connection of the at least one insulating shell being provided via positioning elements that are independent of the fastening elements, the at least one insulating shell being formed having at least a two-piece design, and the at least one insulating shell being arranged in a contactless manner from the outer shell, device, and, if any, adjacent insulating shells.

* * * * *